United States Patent [19]
Aoki et al.

[11] Patent Number: 5,754,310
[45] Date of Patent: May 19, 1998

[54] FACSIMILE SIGNAL RELAY METHOD AND APPARATUS THEREFOR

[75] Inventors: Kazuhiko Aoki, Kanazawa; Yutaka Moriyama, Kawasaki; Kazuhiro Shibuya, Kawasaki; Naomi Yokoyama, Kawasaki, all of Japan

[73] Assignee: Fujitsu Limited, Kanagawa, Japan

[21] Appl. No.: 496,210

[22] Filed: Jun. 28, 1995

[30] Foreign Application Priority Data

Jun. 30, 1994 [JP] Japan ................................. 6-150197
May 22, 1995 [JP] Japan ................................. 7-122630

[51] Int. Cl.$^6$ ................................................ H04N 1/00
[52] U.S. Cl. ................................... 358/406; 358/405
[58] Field of Search ........................... 358/406, 405, 358/407, 400, 409, 412

[56] References Cited

U.S. PATENT DOCUMENTS 5,159,465  10/1992  Maemura et al. ................... 358/405
5,377,017  12/1994  Lam ................................. 358/405
5,418,624   5/1995  Ahmed .............................. 358/405

*Primary Examiner*—Thomas D. Lee
*Assistant Examiner*—Jerome Grant, II
*Attorney, Agent, or Firm*—Helfgott & Karas, P.C.

[57] ABSTRACT

For the purpose of efficiently determining the transmission capacity of a digital relay transmission path, adjusting the phase between commands and responses, and detecting faults, in the case in which a judgment is made that the image information transmission path capacity between communication apparatuses is smaller than or inferior to the performance of the communication apparatuses, when a training signal for the purpose of performing a circuit check is sent from a transmitting-side facsimile machine, the transmitting-side communication apparatus intentionally sends a failed training signal to the receiving-side communication apparatus, this giving notice of an abnormal termination, in response to which the transmitting-side facsimile machine performs a fallback operation so as to reduce the communication speed to a speed at which relaying is possible between the communication apparatuses before sending the image information.

18 Claims, 41 Drawing Sheets

Fig.41

```
**** TRACE NO.0 ****
        CED  FOUND                                    CH:1  START:246680msec
        STATUS:NORMAL                                       END  :248580msec
        DATA:01 00 00 00 00 00 00 00 00 00 00 00 00 00 00 00
             04 10 10 10 00 00 03 10 11 10 30 8d 30 2e 00 13
**** TRACE NO.1 ****
        PREAMBLE  RECEIVE START                       CH:1  START:248780msec
        STATUS:NORMAL                                       END  : ..........
        DATA:03 01 01 00 00 00 00 00 00 00 00 00 00 00 00 00
             00 00 00 00 00 00 47 10 12 10 00 00 30 97 00 13
**** TRACE NO.2 ****
        CED  FOUND                                    CH:0  START:246680msec
        STATUS:NORMAL                                       END  :248600msec
        DATA:01 00 00 00 00 00 00 00 00 00 00 00 00 00 00 00
             04 10 10 10 00 00 03 10 11 10 30 8e 30 2e 00 03
**** TRACE NO.3 ****
        PREAMBLE  RECEIVE START                       CH:0  START:248800msec
        STATUS:NORMAL                                       END  : ..........
        DATA:03 01 01 00 00 00 00 00 00 00 00 00 00 00 00 00
             00 00 00 00 00 00 47 10 12 10 00 00 30 98 00 03
**** TRACE NO.4 ****
        PREAMBLE  RECEIVE STOP                        CH:0  START: ..........
        STATUS:ERROR                                        END  :248920msec
        DATA:05 00 00 00 00 00 00 00 00 00 00 00 00 00 00 00
             aa 00 02 05 88 00 01 10 13 25 30 9e 00 00 c1 03
**** TRACE NO.5 ****
        SYNC ON                                       CH:0  START:249320msec
                                                            END  : ..........
        DATA:02 00 00 00 00 00 00 00 00 00 00 00 00 00 00 00
             00 00 30 00 00 00 00 10 18 25 00 00 30 b2 00 08
**** TRACE NO.6 ****
        SEND     I-FRAME  COM:FAX-MODE(1)             CH:1  START:249480msec
        STATUS:NORMAL                                       END  : ..........
        DATA:aa 10 05 05 00 00 00 00 00 00 00 00 00 00 00 00
             00 00 10 00 01 00 00 10 13 20 00 00 30 ba 00 15
```

FACSIMILE SIGNAL RELAY METHOD AND APPARATUS THEREFOR

BACKGROUND OF THE INVENTION

1. Field of the Invention

The present invention relates to a facsimile signal relay method and apparatus therefore, and more particularly it relates to a facsimile signal relay method for relay transmission of a GIII facsimile signal over a digital transmission path and an apparatus therefore.

2. Description of the Related Art

In facsimile signal relay methods of the past, a command signal modulated from the sending-side facsimile machine is first received and demodulated by a modem within the communication equipment on one side, which performs digital relay transmission, thereby converting the signal to the required digital signal, which is sent to the communication equipment on the other side. At the communication equipment on the other side, the above-noted digital signal is received, this signal being demodulated to the same signal as on the transmitting side and sent to the receiving-side facsimile machine.

As the digital circuit between the above-noted two pieces of communicating communication equipment, a dedicated line having a transfer rate of, for example, 64 Kbs is used. In this case, multiplexing is done of the above-noted 64 Kbs transfer rate into four lines of 16 Kbs or 8 lines of 8 Kbs transfer rate. The image information relay speed over the digital transmission path is adjusted by the bandwidth in accordance with the above-noted division, and by the communication equipment performance, such as support of a faster communication speed (of 14.4 Kbs).

In Japanese Unexamined Patent Application Publication No. 62-206940, an example of a relay communication apparatus is disclosed, in which a facsimile signal is converted to a digital signal by a modulator and then multiplexed, and in which after the signal is relayed over the digital transmission path, it is converted once again to an analog signal by a demodulator.

However, in the prior art as described above, in the case, for example, when the bandwidth of the digital transmission path is small, or in which it exceeds the capacity of the communication apparatus, even if a training signal is properly relayed before transmitting image information, there are cases in which it is not possible to transmit the image information.

Additionally, in the above-noted prior art, because of the facsimile response time, the delay in the transmission path, and processing delay in the communication apparatus, in the case in which there is a skew between a command and the response, a skew in statuses occurs between the transmitting-side facsimile machine and the receiving-side facsimile machine, this leading to the problem of cases in which it is not possible to properly send the image information.

In addition, in the above-noted prior art, since there are many elements, such as the facsimile, public lines, communication apparatuses, and dedicated relay lines, which can cause faults, the identification of the fault location is an extremely time-consuming troubleshooting process. In the past, even when tracing data is held, because of a finite memory capacity, with the passage of time this is overwritten, so that required data is lost.

SUMMARY OF THE INVENTION

In consideration of the above-described problems with the prior art, an object of the present invention is to enable the relay of image information by adjusting the transmission speed, even in the case when the bandwidth of the digital transmission path used for the relaying is small, or in which it exceeds the capacity of the communication apparatus, and in the case in which there is a mismatch in performance between the transmitting-side communication apparatus and the receiving-side communication apparatus.

Another object of the present invention is to enable relay of image information by performing an adjustment of the command and response protocol, even over a communication path in which there is a phase skew between commands and responses, caused by facsimile response time, the delay in the transmission path, and processing delay in the communication apparatus.

In addition, an object of the present invention is to provide a working environment which, when a fault occurs, reduces the amount of work required to determine the cause and perform tests to replicate the fault, thereby enabling efficient troubleshooting.

According to the present invention, a GIII facsimile signal relay method, in which the transmitting-side communication apparatus that relays a facsimile signal demodulates a modulated signal from the transmitting-side facsimile machine and sends this demodulated signal to a digital relay transmission path, and further wherein the receiving-side communication apparatus which relays the facsimile signal modulates the above-noted received digital signal and sends it to the receiving-side facsimile machine, wherein in the case in which the transmitting-side communication apparatus judges, when a training signal for the purpose of checking the circuit is sent from the transmitting-side facsimile machine, that the image information transmission capacity of the above-noted digital relay transmission path is smaller than the image information capacity to be relayed, a bad training signal is intentionally sent to the receiving-side communication apparatus, this intentional transmission of the bad training signal giving notice from the receiving-side facsimile machine to the transmitting-side facsimile machine of improper termination, the transmitting-side facsimile machine having received this notification of improper termination sending the image information only after performing a fallback operation which lowers the image information transmission speed to a speed at which relaying is possible between the above-noted communication apparatuses.

The above-noted transmitting-side communication apparatus can also be configured so that in the case in which the transmitting-side communication apparatus judges, when a training signal for the purpose of checking the circuit is sent from the transmitting-side facsimile machine, that the image information transmission capacity of the above-noted digital relay transmission path is smaller than the image information capacity to be relayed, a bad training signal is intentionally sent to the transmitting-side facsimile machine, the transmitting-side facsimile machine having received this notification of improper termination sending the image information only after performing a fallback operation which lowers the image information transmission speed to a speed at which relaying is possible between the above-noted communication apparatuses.

Additionally, the receiving-side communication apparatus can be configured so that in the case in which it judges, when a training signal for the purpose of checking the circuit is sent from the transmitting-side facsimile machine, that the image information transmission capacity of the above-noted digital relay transmission path is smaller than the image information capacity to be relayed, a bad training signal is intentionally sent to the transmitting-side facsimile machine, thereby giving notice from the receiving-side facsimile machine to the transmitting-side facsimile machine of improper termination, the thus-notified transmitting-side facsimile machine then sending the image information only after performing a fallback operation which lowers the image information transmission speed to a speed at which relaying is possible between the above-noted communication apparatuses.

It is also possible to configure the receiving-side communication apparatus so that, in the case in which it judges, when a training signal for the purpose of checking the circuit is sent from the transmitting-side facsimile machine, that the image information transmission capacity of the above-noted digital relay transmission path is smaller than the image information capacity to be relayed, a bad training signal is intentionally sent to the transmitting-side communication apparatus, so that the transmitting-side facsimile machine sends the image information only after performing a fallback operation which lowers the image information transmission speed to a speed at which relaying is possible between the above-noted communication apparatuses.

Furthermore, according to the present invention, a GIII facsimile signal relay method, in which the transmitting-side communication apparatus that relays a facsimile signal demodulates a modulated signal from the transmitting-side facsimile machine and sends this demodulated signal to a digital relay transmission path, and further wherein the receiving-side communication apparatus which relays the facsimile signal modulates the above-noted received digital signal and sends it to the receiving-side facsimile machine, wherein, when a command which is received from the above-noted transmitting-side communication apparatus is relayed to the above-noted receiving-side facsimile machine, a time-out counter set to a prescribed time is started, if a response is received from the receiving-side facsimile machine after the time-out time has elapsed and before a retry command is given from the receiving-side facsimile machine, this response is discarded, the above-noted retry command being relayed to the receiving-side facsimile machine. In the above-noted receiving-side communication apparatus, it is possible to include the retransmission of the command to the above-noted receiving-side facsimile machine at the time-out of the above-noted timer.

Additionally, it is possible to configure the above-noted receiving-side communication apparatus so that, when a command received from the above-noted transmitting-side communication apparatus is relayed to the receiving-side facsimile machine, a timer set to a prescribed time-out time is started, the above-noted receiving-side communication apparatus retransmitting the command to the above-noted receiving-side facsimile machine at the time-out time of the above-noted timer, and in the case in which a retry command is given from the above-noted transmitting-side facsimile machine after the time-out time has elapsed and before a response is received from the receiving-side facsimile machine, the command is discarded, and the above-noted response is relayed to the transmitting-side facsimile machine.

In addition, the above-noted transmitting-side communication apparatus can be configured so that when a command received from the above-noted transmitting-side facsimile machine is relayed to the above-noted receiving-side communication apparatus, a timer set to a prescribed time-out time is started, and in the case in which a response is received from the receiving-side communication apparatus within the above-noted time-out time, the transmitting-side communication apparatus discards the response.

Furthermore, a facsimile signal relay communication apparatus is provided, this apparatus including a tracing section which performs a communication protocol trace between the other stations relay communication apparatus and the included facsimile machine.

The above-noted tracing section performs a comparison between a command which includes a pre-established terminal identifier and a prespecified telephone number, and holds the trace data only in the case in which these coincide.

The commands which include a prescribed terminal identifier include CSI (calling station identifier), TSI (transmitting subscriber identifier), and the CIG (calling subscriber identification), and the like. Combinations of these, such as CSI&TSI, CSI&CIG, and TSI&CIG are also used, in which case trace data is only held in the case in which the telephone numbers specified at both sides coincide.

In the case in which the relay communication apparatus uses a plurality of channels, it is possible to specify the physical channel to be traced beforehand, with trace data from coinciding channels only being held, and it is further possible to specify a mode in which trace data is not held. The display section converts the above-noted held trace data to a prescribed format and displays it in real time.

According to the present invention, when the communication apparatus makes the judgment, from a DCS (digital command signal) received from the facsimile machine or from the speed parameter which is included in a DCS command received from the other side's communication apparatus, that relaying is impossible because of either bandwidth or performance, the training signal is intentionally caused to fail, the result of this being notified to the transmitting-side facsimile machine. The above-noted transmitting-side facsimile machine, in response to this notification, uses a fallback function so that sending of the image information is started only after the communication speed is reduced to a speed at which relaying is possible.

Furthermore, in addition to relay processing performance, a communication apparatus can have a speed that is not supportable (for example, 14,000 Kbs) by some modems.

Additionally, according to the present invention, after the relay communication apparatus sends a command to the facsimile machine, an appropriate timer is used to monitor the time until the receipt of a response, and in the case in which a response is not detected before a prescribed time elapses, the relay communication apparatus independently performs adjustment of the transmitting/receiving protocol, preventing what is known as phase skew between commands and responses.

Furthermore, to make effective use of tracing in performing analysis of the protocols between the relay communication apparatus and the facsimile machine and between relay communication apparatuses, a variety of masks can be set at the point at which trace data is held. It is also possible to select one of a plurality of channels, the thus extracted desired data being converted to a display format that enables easy analysis. The above-noted data can also be displayed in real time.

BRIEF DESCRIPTION OF THE DRAWINGS

The present invention will be more clearly understood from the description as set forth below, with reference being made to the accompanying drawings, in which:

FIG. 41 is a drawing which shows an example of the display screen of the maintenance console.

DESCRIPTION OF THE PREFERRED EMBODIMENTS

Before describing the preferred embodiment of the present invention, examples of the related art are provided, with reference made to the relevant accompanying drawings.

Figure 1:
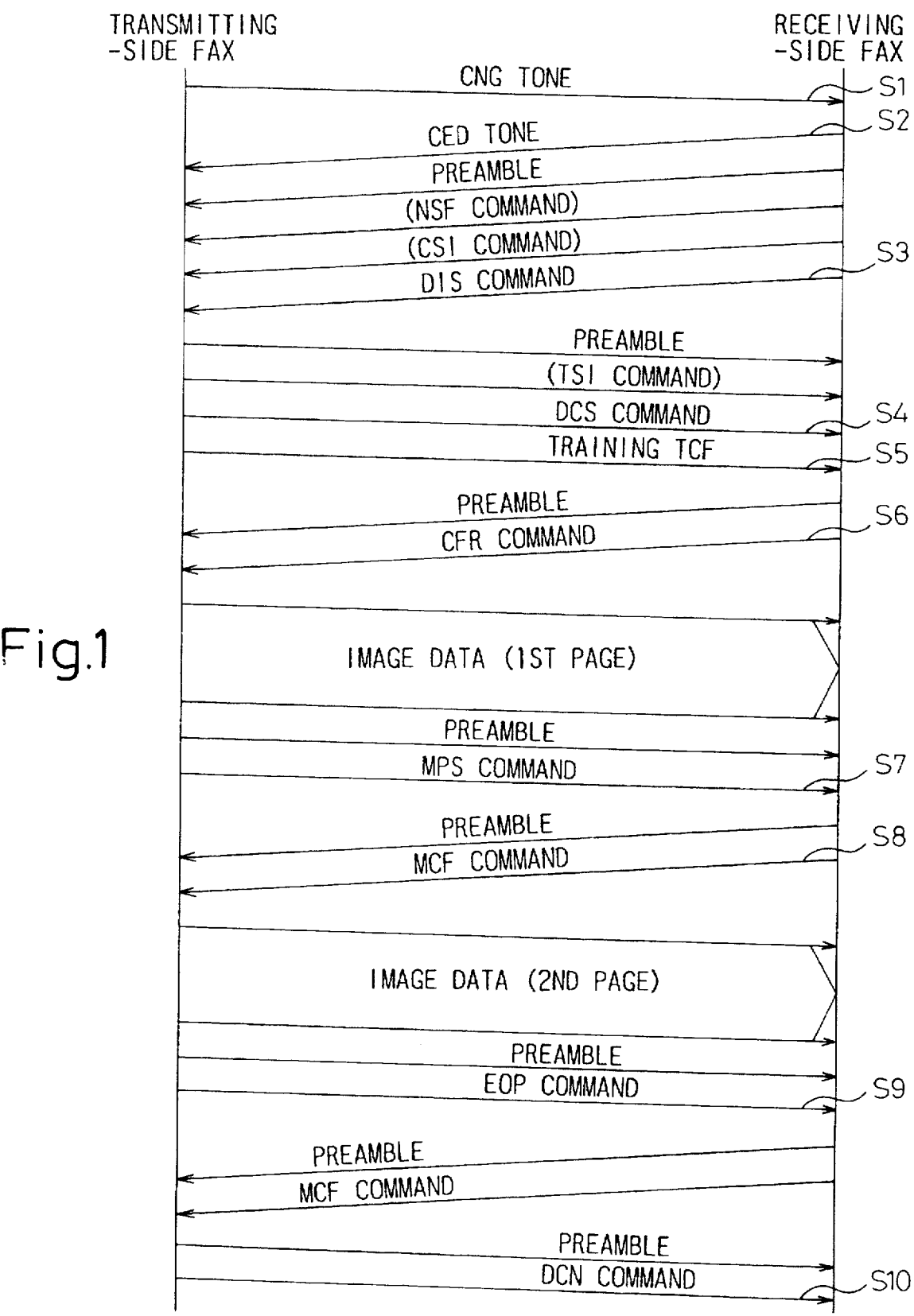
FIG. 1 is a drawing which shows an example of the general communication sequence for GIII facsimile.

FIG. 1 is a drawing which shows an example of the general communication sequence in GIII facsimile.

FIG. 1 will be used as the basis for describing the basic command related to the present invention, from the start to the end of transfer of image information. Although not shown in FIG. 1, in general, a dialing operation establishes the communication path between the transmitting and receiving ends. Next, verification is made at both ends, using the CNG (calling tone) and CED (called station identification), that the device on both ends is a facsimile machine (S1, S2), after which a DIS (digital identification signal) command is sent from the receiving-side facsimile machine to the transmitting-side facsimile machine, for the purpose of notification of capacity in terms of communication speed and parameters of the receiving side.

When the above-noted DIS command is received, a DCS (digital command signal) for the purpose of notification of the speed that has been established, and a training signal for the purpose of checking the communication circuit are sent from the transmitting-side facsimile machine to the receiving-side facsimile machine. If the above-noted sequence is normal, the receiving-side facsimile machine sends a CFR (confirmation to receive) command, but if the sequence results in an abnormal termination, it sends a FTT (failure to train) command. When the transmitting-side facsimile machine receives a CFR command, it begins to transmit image information in units of pages. If, however, the FTT command is received, the transmitting-side facsimile machine performs a fallback operation to lower the communication speed progressively in steps, the steps in the sequence after the above-noted DCS command and training signal being executed once again. NSF (nonstandard facilities) is used to give notification when the receiving-side terminal to give notification of that condition, the CSI (called subscriber identification) command is used to notify the other side of the receiving-side facsimile machine's telephone number, and the TSI (transmitting subscriber identification) command is used to give notification of the transmitting-side facsimile machine's telephone number.

When the above-noted sequence is completed, next the transmission of image data begins. The MPS (multi-page signal) command is output (S7) for every page from page 2, the MCF (message confirmation) command is used to verify normal receipt (S8), and the EOP (end of procedure) is output when all the image data has been transmitted (S9). Finally, the DCN (disconnect) command breaks the circuit connection (S10).

Figure 2:
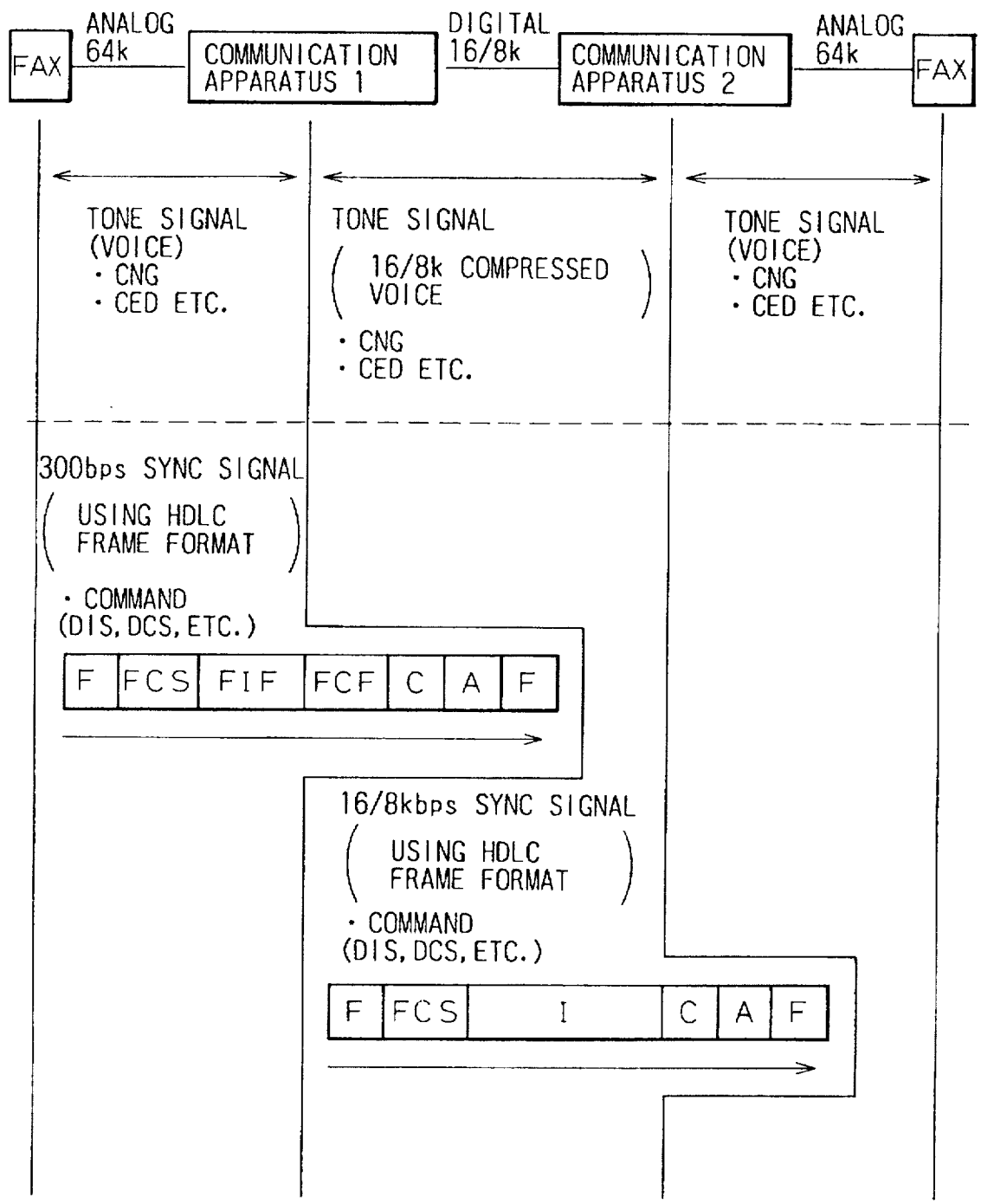
FIG. 2 is a drawing which show an example (1) of a GIII facsimile signal relaying method via a digital relay line.
Figure 3:
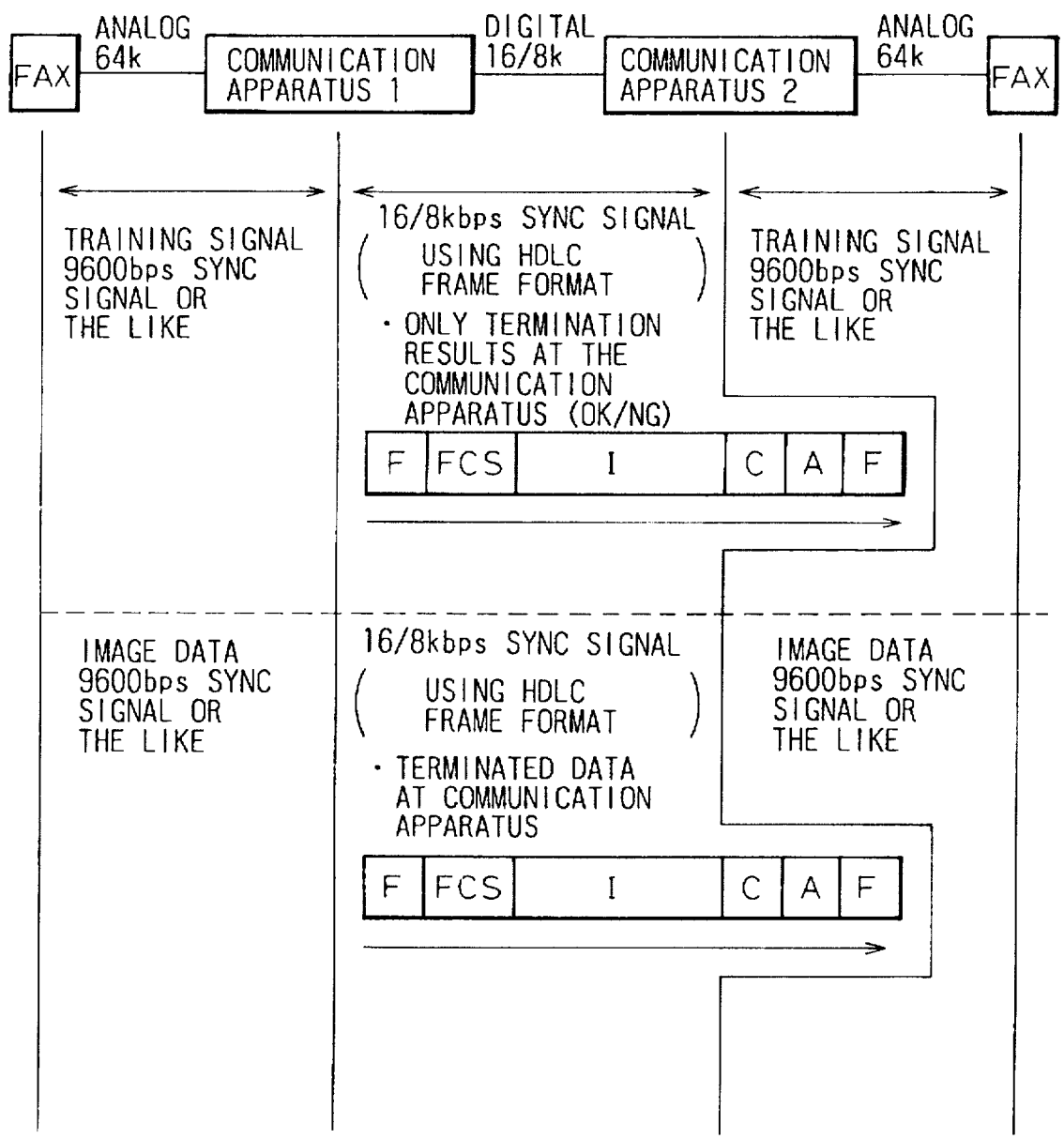
FIG. 3 is a drawing which show an example (2) of a GIII facsimile signal relaying method via a digital relay line.

FIG. 2 and FIG. 3 shows simplified examples of the GIII facsimile signal relay method via a digital relay circuit.

In FIG. 2 shows examples of the command format for tone signal commands such as CNG and CED, and the digital signal format on the digital relay circuit, which were explained in relation to FIG. 1. As shown in FIG. 2, to use the digital transmission path efficiently, as is the case with voice signals, the tone signal is transmitted over the digital circuit after being compressed and encoded to a 16/8 k signal. An HDLC format signal with a communication speed of 300 bps is used for the DIS and DCS commands in GIII facsimile. Commands and data signals on the digital circuit other than voice signals are all in 16/8 bps HDLC frames. However, these are frames that are established specifically for mutual use between two communicating communication apparatuses.

FIG. 3 shows an example of the formats for the training signal and the image signal.

As described above, even the training signal and image data signal are transferred on the digital circuit in 16/8 bps HDLC frames. For this reason, with regard to the training signal, notification from the facsimile terminal to the communication apparatus is only given for the final results (ok or bad), this being completed unrelated to such factors as the bandwidth used to relay image data. Therefore, in the above-described prior art, the training signal for checking the circuit does not function in the digital relay circuit, so that the previously described problem occurs.

Figure 4:
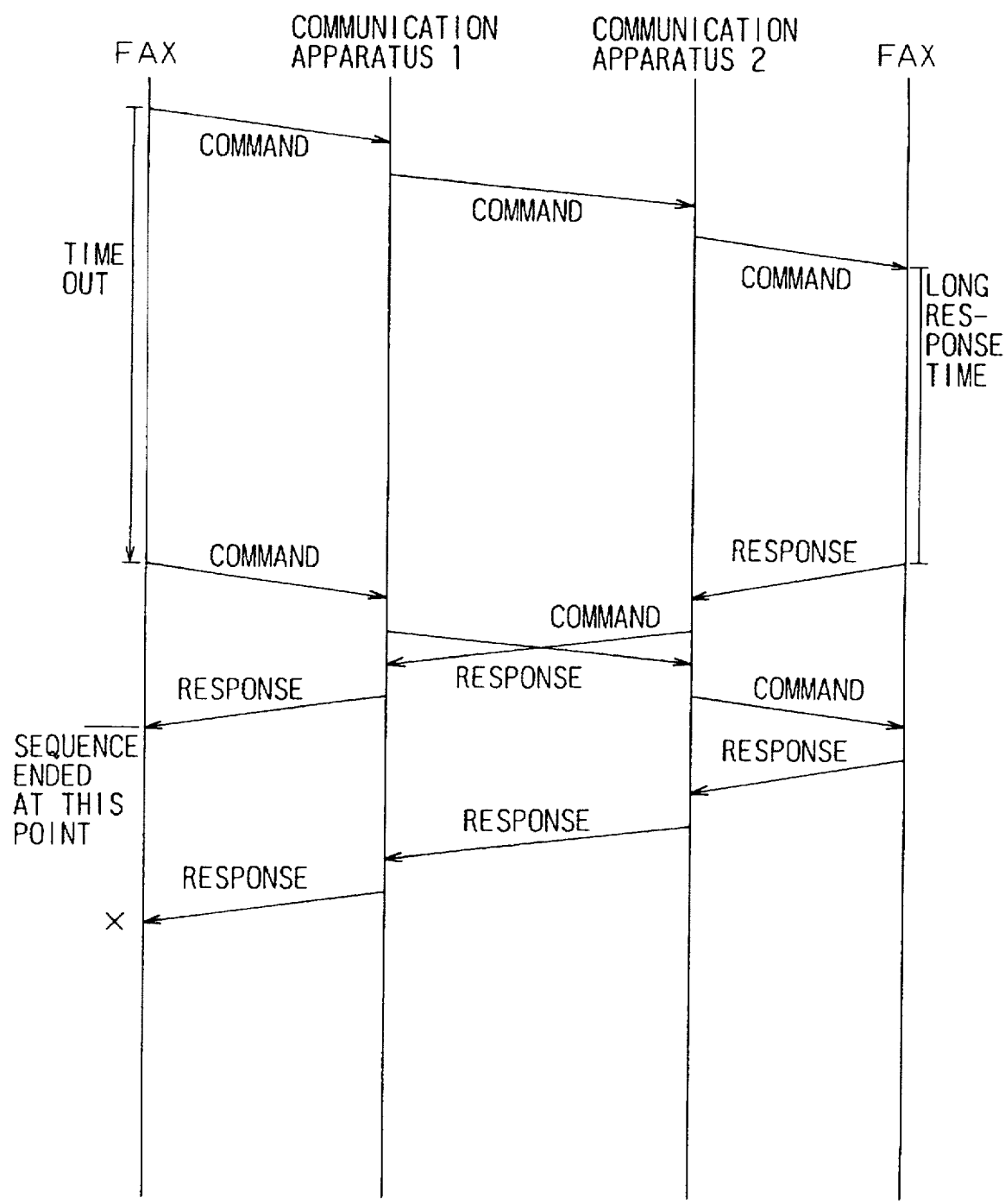
FIG. 4 is a drawing which shows an example of the generation of a fault which occurs because of the delay of a response with respect to a command.

FIG. 4 illustrates a fault which occurs because of the delay between a command and the resulting response.

FIG. 4 shows the example of the case in which a command such as described above is sent from the transmitting-side facsimile machine, but because of a difference in type of machine or other fault a delay occurs in the response, the transmitting-side facsimile machine times out and sends the command once again, but subsequently a response is received to the original command. In this case, at the point at which the late response to the first command is received, the transmission sequence is ended, so that thereafter a skew develops between the communication statuses of the transmitting-side facsimile machine and the receiving-side facsimile machine, this leading to a problem that it might not be possible to relay image information and the like.

Figure 5:
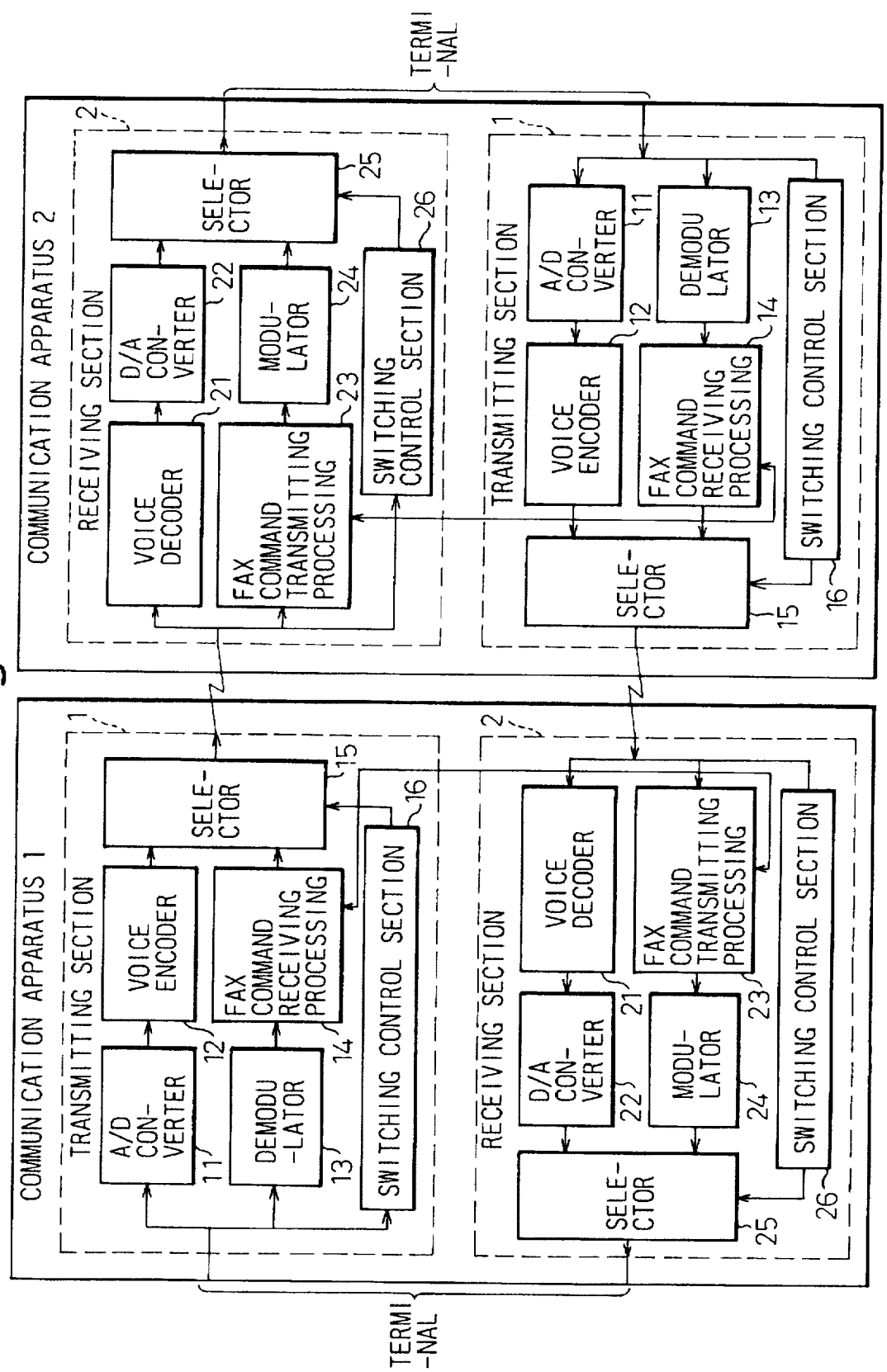
FIG. 5 is block diagram which shows an embodiment of a communication apparatus which implements a facsimile signal relay method according to the present invention.

FIG. 5 is a block diagram which shows an embodiment of a communication apparatus for the purpose of implementing the facsimile signal relay method according to the present invention.

In FIG. 5, in communication apparatus 1, if a telephone terminal is connected, the switching control section 16 of the transmitting section 1 performs operates selector 15 so that the output of the voice encoder 12 is selected. The switching control section 26 of the receiving section 2 operates selector 25 so that the output of the D/A converter 22 is selected.

By doing this, the voice signal from the telephone terminal passes through the A/D converter 22, the voice encoder 12 and the selector 15 of the transmitting section 1, while a digital signal from a digital transmission path passes through the voice demodulator 21, the D/A converter 22 and the selector 25 of the receiving section 2.

Next, in the case in which a facsimile machine is connected as the terminal, the switching control section 16 of the transmitting section 1 makes a judgment as to whether or not a facsimile signal is being received, and if it judges that the signal received is a facsimile signal, it causes the selector 15 to operate so as to select the output of the facsimile command receiving processing section 14. In the same manner, if the judgment is made that the input from the digital transmission path is a facsimile signal, the switching control section 26 of the receiving section 2 operates the selector 25 so as to select the output of the modulator 24.

For this reason, the facsimile signal from the facsimile machine is converted to a digital signal by the demodulator 13 of the receiving section 1, after which command detection processing is performed by the facsimile command receiving processing section 14, output being sent to the digital transmission path via the selector 15. In contrast to this, the signal relayed from the digital transmission path is received by the facsimile command transmitting processing section 23, the next stage, the modulator 24, performing modulation of the command from the facsimile command transmitting processing section 23 and of the received image information, the resulting modulated signal being sent to the facsimile machine via the selector 25.

Each block of the above-described communication apparatus 1 is exactly the same as the corresponding block of the communication apparatus 2 and these blocks have been assigned the same reference numerals.

Next, the details of processing performed in the above-noted facsimile command receiving processing section 14 and facsimile command transmitting processing section 23 will be explained, in connection with the present invention.

Figure 6:
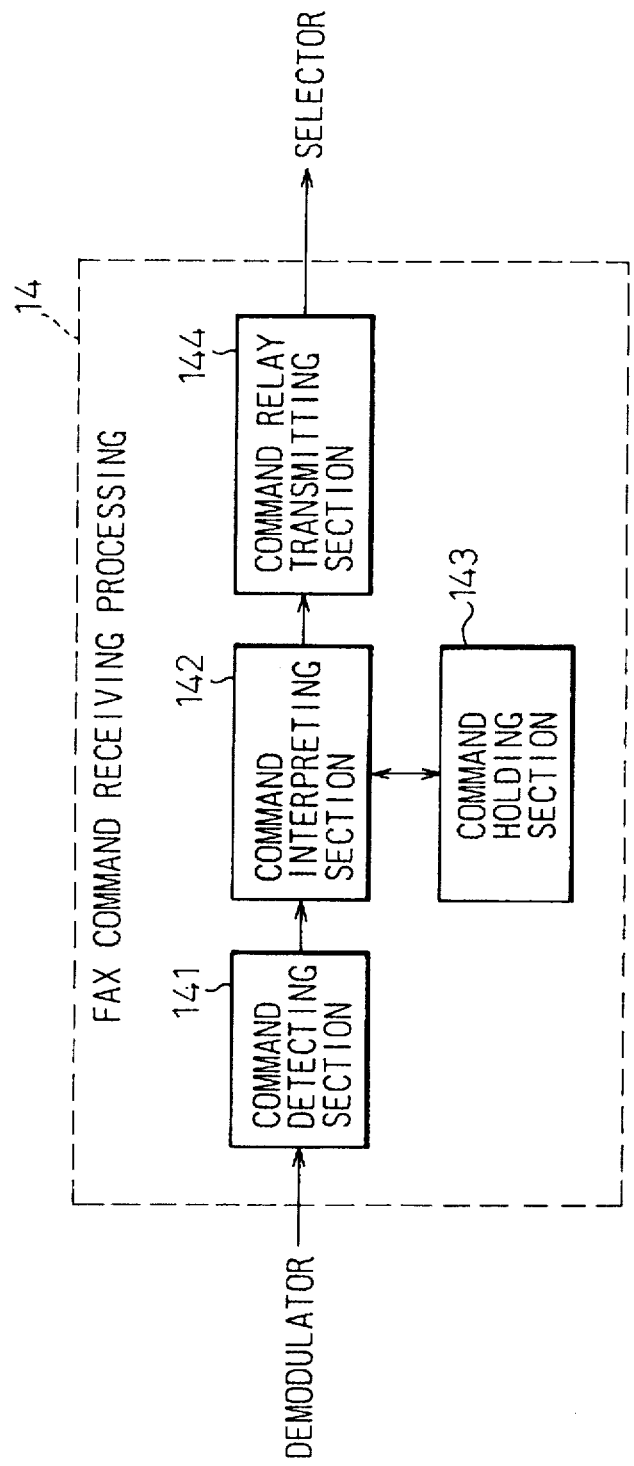
FIG. 6 is a drawing which shows an example of the block diagram configuration of the facsimile command receiving processing section in the first embodiment of the present invention.
Figure 7:
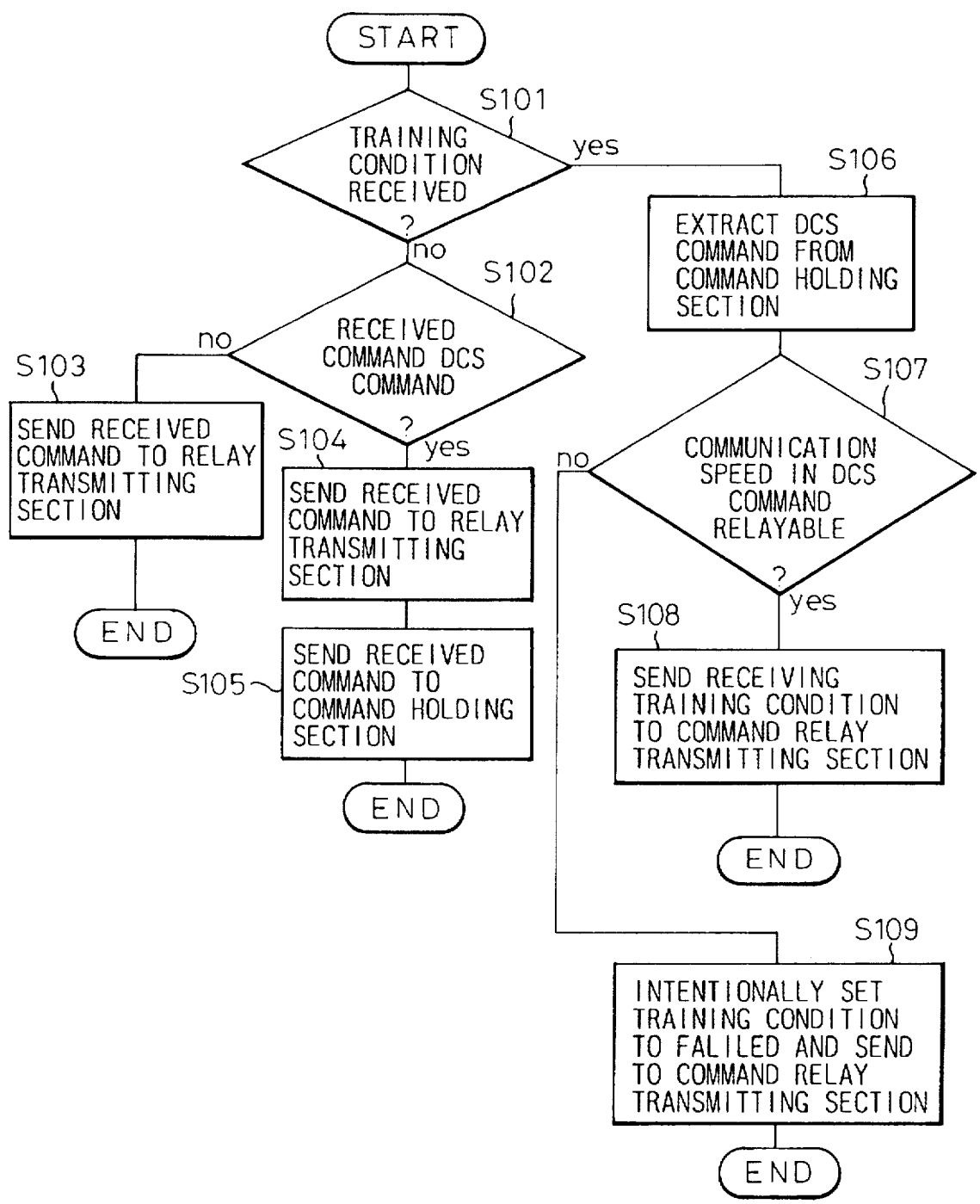
FIG. 7 is a flowchart which shows an example of the processing flow in the command interpreting section of FIG. 6.
Figure 8:
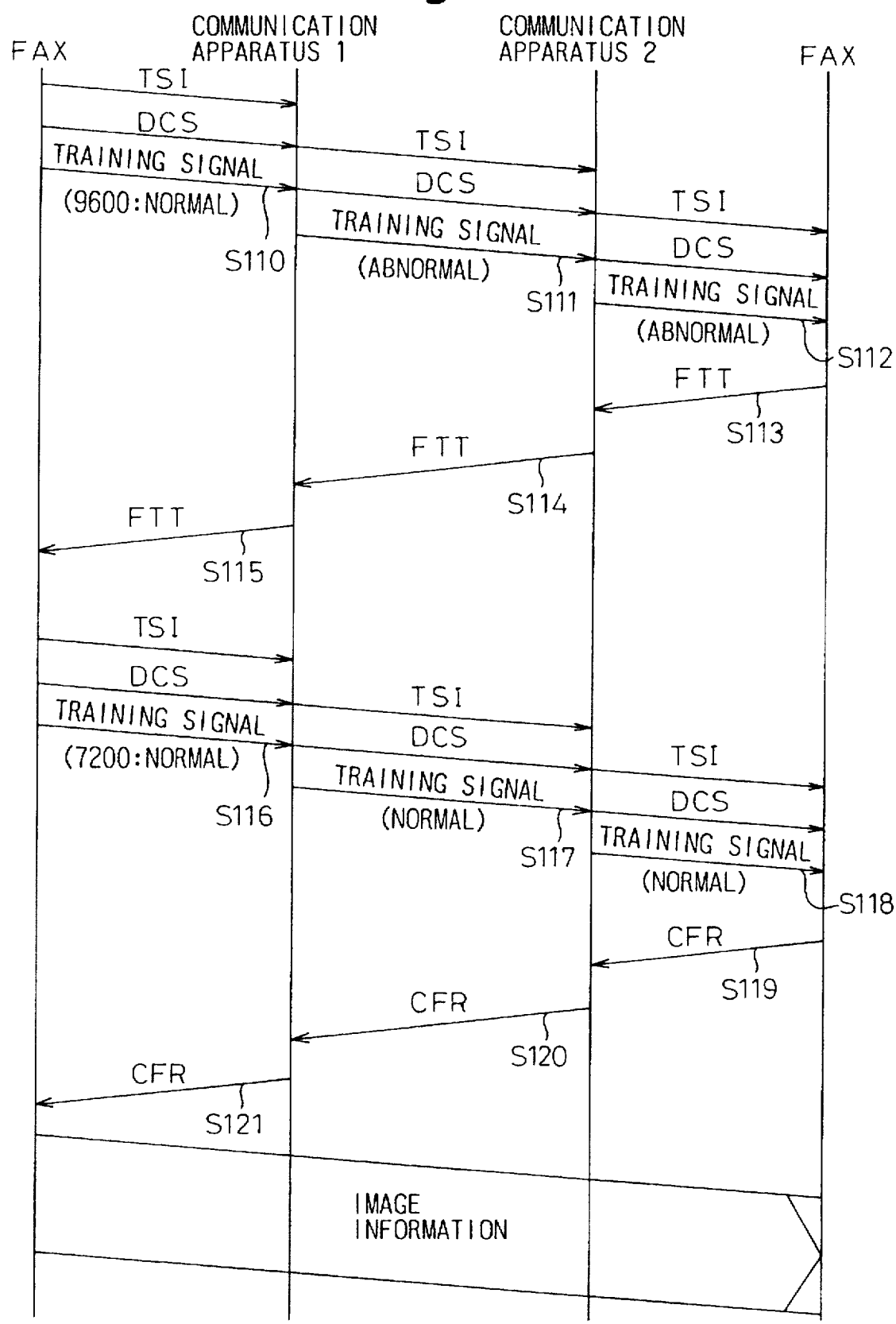
FIG. 8 is a drawing which shows an example of the command sequence in the first embodiment of the present invention.

FIGS. 6 through 8 illustrate the first embodiment of the present invention.

FIG. 6 shows an example of the block diagram configuration of the facsimile command receiving processing section 14.

FIG. 7 is a flowchart which shows an example of the processing flow in the command interpreting section of FIG. 6.

FIG. 8 shows an example of the command sequence in the first embodiment of the present invention.

The first example will be described below, with reference made to FIG. 6 and FIG. 7.

The command detecting section 141 recognizes commands which are sent from the facsimile machine. When this command reception is completed, the received command is sent to the next stage, which is the command interpreting section 142. The command interpreting section 142 tests whether the command is a DCS command (S102), and if it is a command other than a DCS command, that command is sent to the command relay transmitting section 144 (S102, S103). If the command is the DCS command, the DCS command is sent to the command relay transmitting section 144 and also to the command holding section 143 (S102, S104, S105), and the command is held by the above-noted command holding section 143.

After that, when the training signal is detected by the command detecting section 141, the change in status of the signal is sent to the command interpreting section 142 (S101). The command interpreting section 142 accesses the DCS command that had been held in the command holding section 143, performs a check of the image information transmission speed included therein, and, if it judges that it is a communication speed at which its communication apparatus can relay, it sends the training status as is to the command relay transmitting section 144 (S106 to S108). If, however, it judges to be a speed at which relaying is not possible, it sends an intentionally failed training status to the command relay transmitting section 144 (S107, S109).

FIG. 8 shows an example of the above-noted sequence flow. At the beginning, the training signal that is received from the 9600 bps facsimile machine is received normally by the communication apparatus 1 (S110). However, if for example the bandwidth that can be used between the communication apparatus I and the communication apparatus 2 at that time is 8 Kbs, although the training signal itself is properly sent from the communication apparatus 1 to the communication apparatus 2, it will not be possible thereafter to transmit image information. For this reason, the communication apparatus 1 sends an intentionally failed training signal to the communication apparatus 2, to indicate to the communication apparatus 2 that the relay transmission between the two communication apparatuses is not possible (S111).

Thereafter, the communication protocol is the same as in the past, as a result of which the transmitting-side facsimile machine receives an FTT command which tells it that the training was improper (S112 to S115). Then, the transmitting-side facsimile machine performs a fallback operation, making a step reduction in communication speed to a lower speed conforming to the GIII facsimile standard, and repeating the sending of the training signal each time this is done. In the example shown in FIG. 8, the training signal is terminated normally at a communication speed of 7200 bps (bandwidth of 8 Kbs), and the transmitting-side facsimile machine receives a CFR command (S116 to S121), by which the relay transmission of image information is started.

Figure 9:
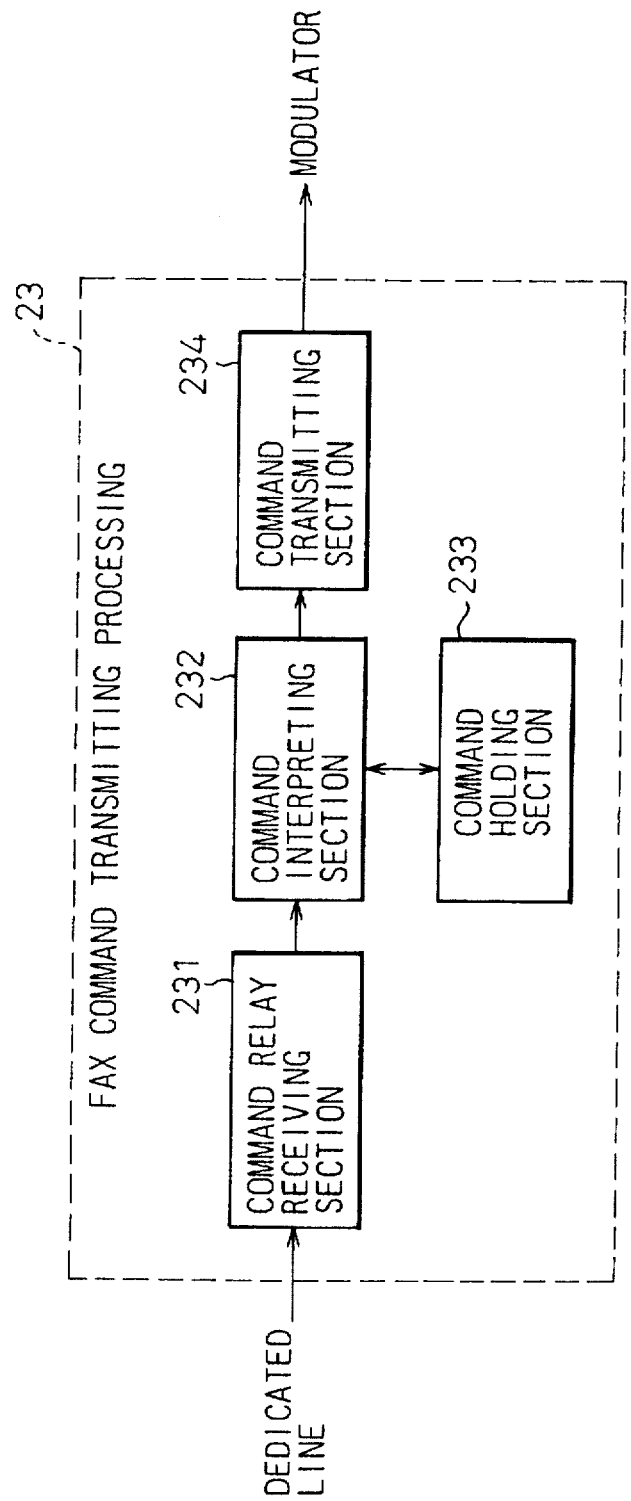
FIG. 9 is a drawing which shows an example of the block diagram configuration of the facsimile command transmitting processing section of the second embodiment of the present invention.
Figure 10:
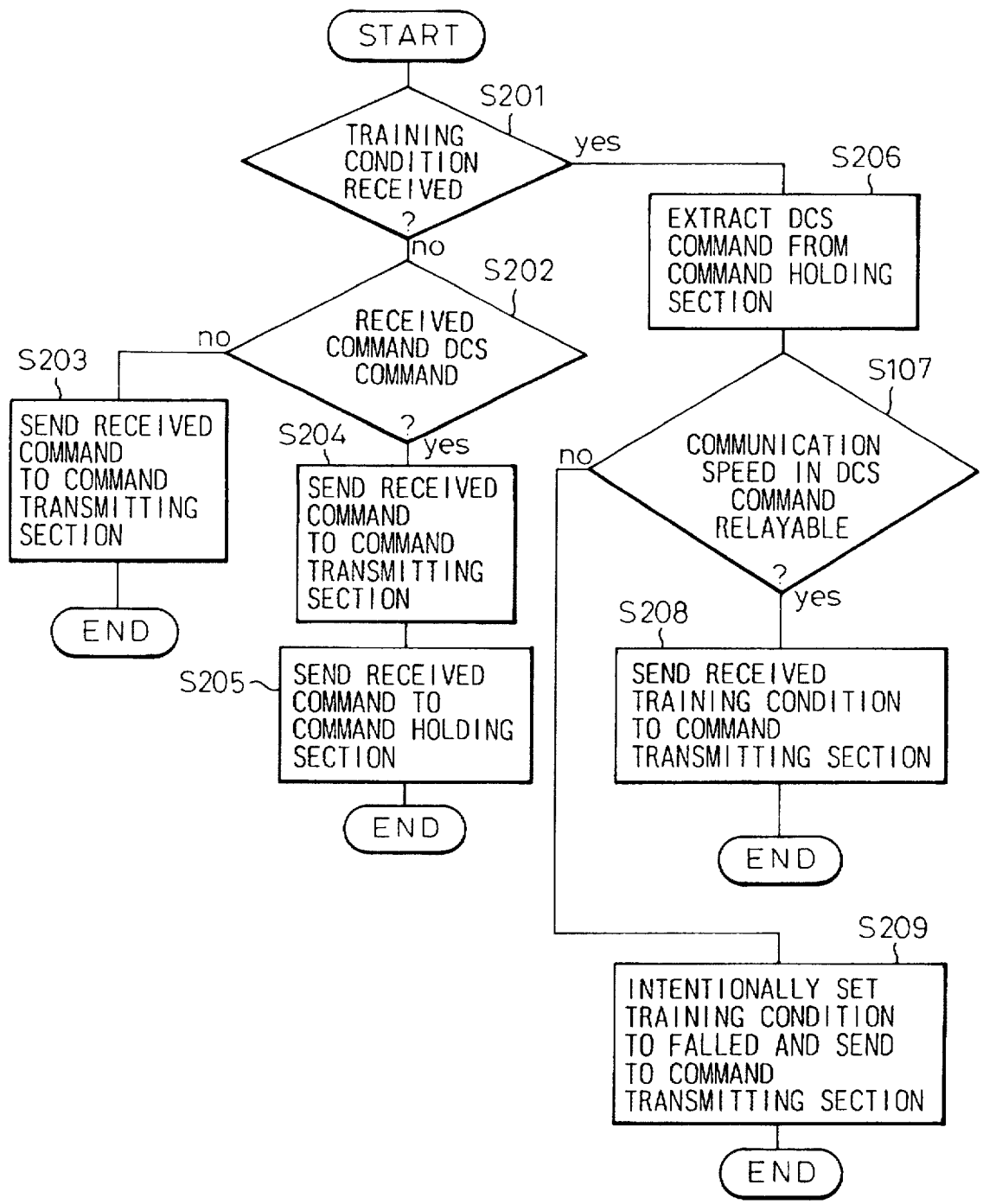
FIG. 10 is a flowchart which shows an example of the processing flow in the command interpreting section of FIG. 9.
Figure 11:
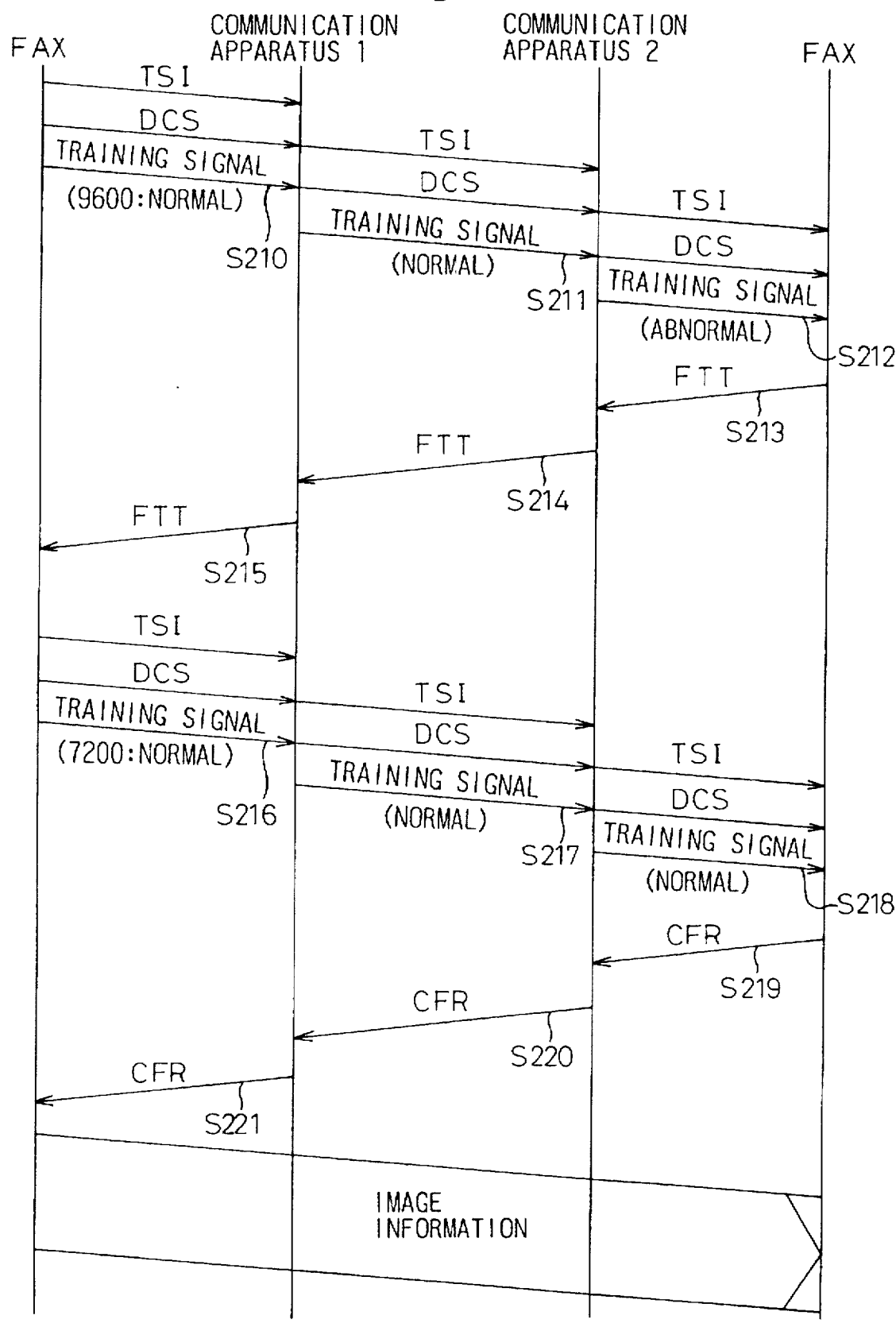
FIG. 11 is a drawing which shows an example of the command sequence in the second embodiment of the present invention.

FIGS. 9 through 11 illustrate the second embodiment of the present invention.

FIG. 9 shows an example of the block diagram configuration of the facsimile command transmitting processing section 23 of FIG. 5.

FIG. 10 is a flowchart which shows an example of the processing flow in the command interpreting section 232 of FIG. 9.

FIG. 11 shows an example of the command sequence in the second embodiment of the present invention.

The second embodiment of the present invention will be described below, with reference made to FIG. 9 and FIG. 10.

In the receiving-side communication apparatus 2 a command relayed from the transmitting-side communication apparatus 1 with which it is communicating is recognized by the command relay receiving section 231. When the reception of the command is completed, the command is sent to the command interpreting section 232. The command interpreting section 232 tests whether this command is a DCS command (S202), and if it is a command other than a DCS command, that command is sent to the command transmitting section 234 (S202, S203). If the command is the DCS command, the DCS command is sent to the command transmitting section 234 and also to the command holding section 233 (S202, S204, S205), and the command is held by the above-noted command holding section 143.

After that, the change in status of the training signal is detected by the command relay receiving section 231, and a notification of this is sent to the command interpreting section 232 (S201). The command interpreting section 232 accesses the DCS command that had been held in the command holding section 143, performs a check of the image information transmission speed included therein, and, if it judges that it is a communication speed at which its communication apparatus can relay, it sends the training status as is to the command relay transmitting section 144 (S206 to S208). If, however, it judges that relaying is not possible, rather than sending the notification of the change in status of the training signal, it sends an intentionally failed training status to the command relay transmitting section 234 (S207, S209).

FIG. 11 shows an example of the above-noted sequence flow. The difference with respect to the previously described FIG. 7 is that, the training signal is properly relayed up to the communication apparatus 2 (S210, S211). However, if as described above the usable bandwidth between the communication apparatus 1 and the communication apparatus 2 is 8 Kbs, the image information still cannot be sent. Therefore, in this example, by sending an intentionally failed training signal to the transmitting-side facsimile machine, the communication apparatus 2 gives notification of the fact that communication is not possible (S212). The protocol thereafter is the same as in FIG. 7.

Figure 12:
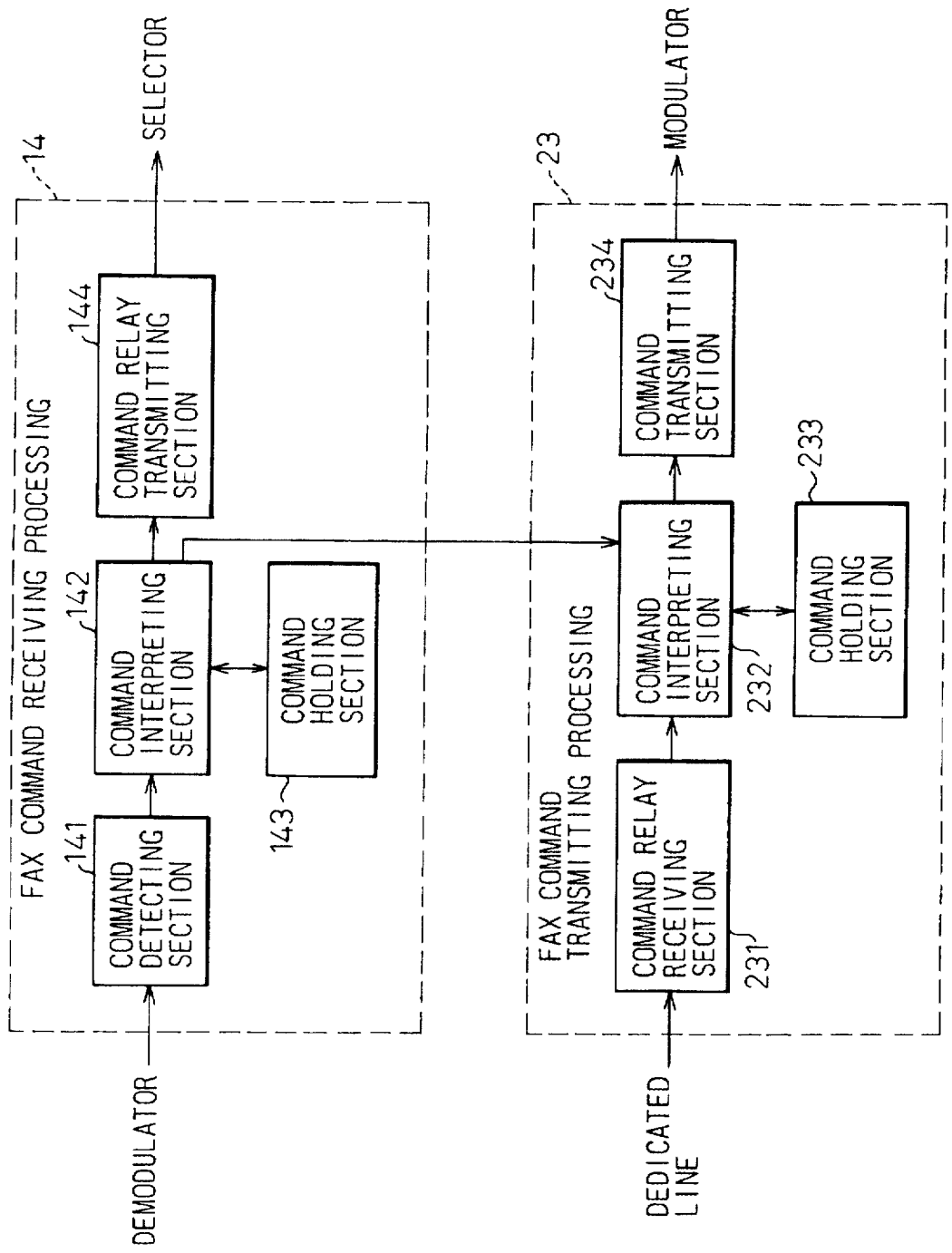
FIG. 12 is a drawing which shows an example of the block diagram configuration of the facsimile command transmitting/receiving processing section of the third embodiment of the present invention.
Figure 13:
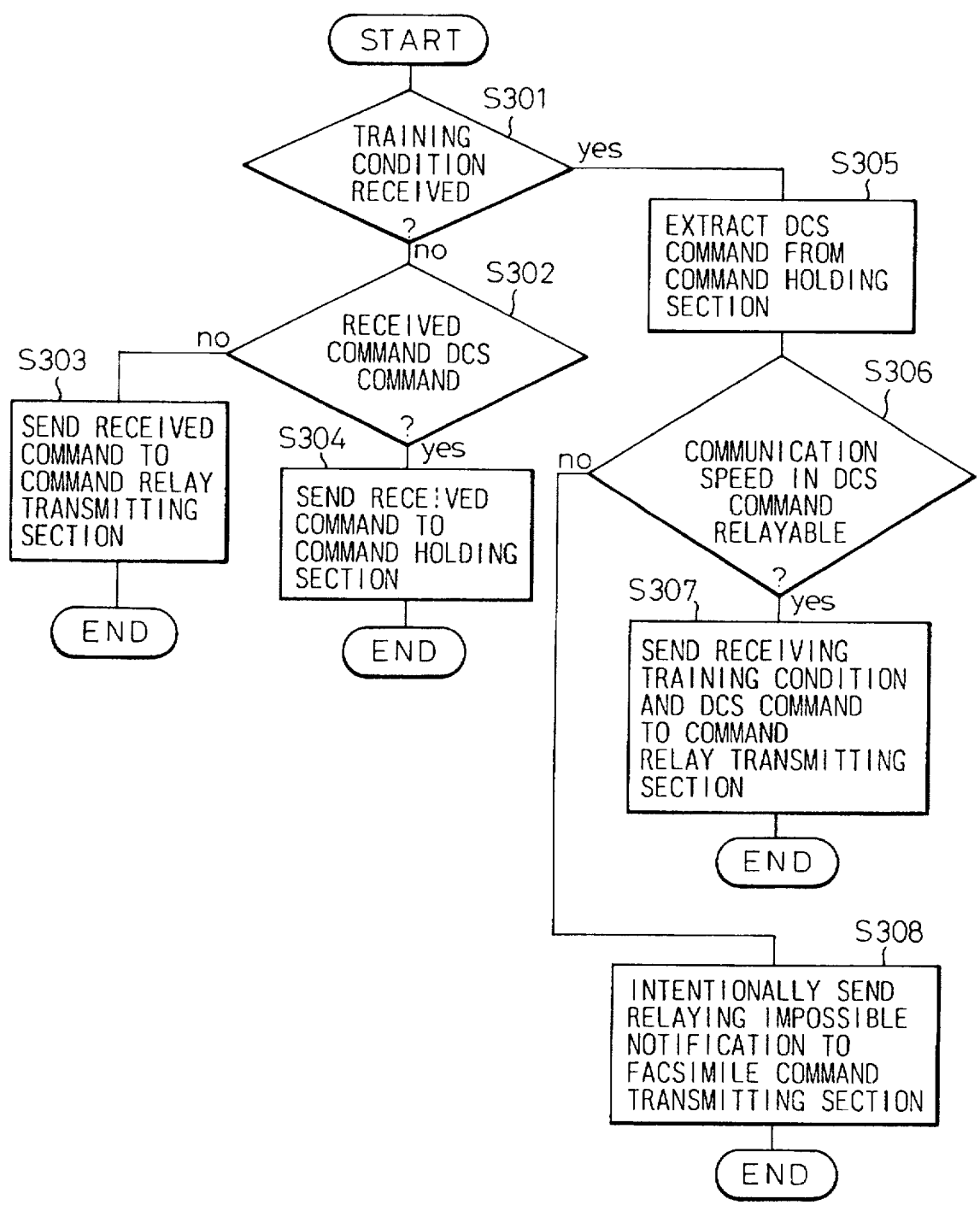
FIG. 13 is a flowchart which shows an example of the processing flow in the command interpreting section of FIG. 12.
Figure 14:
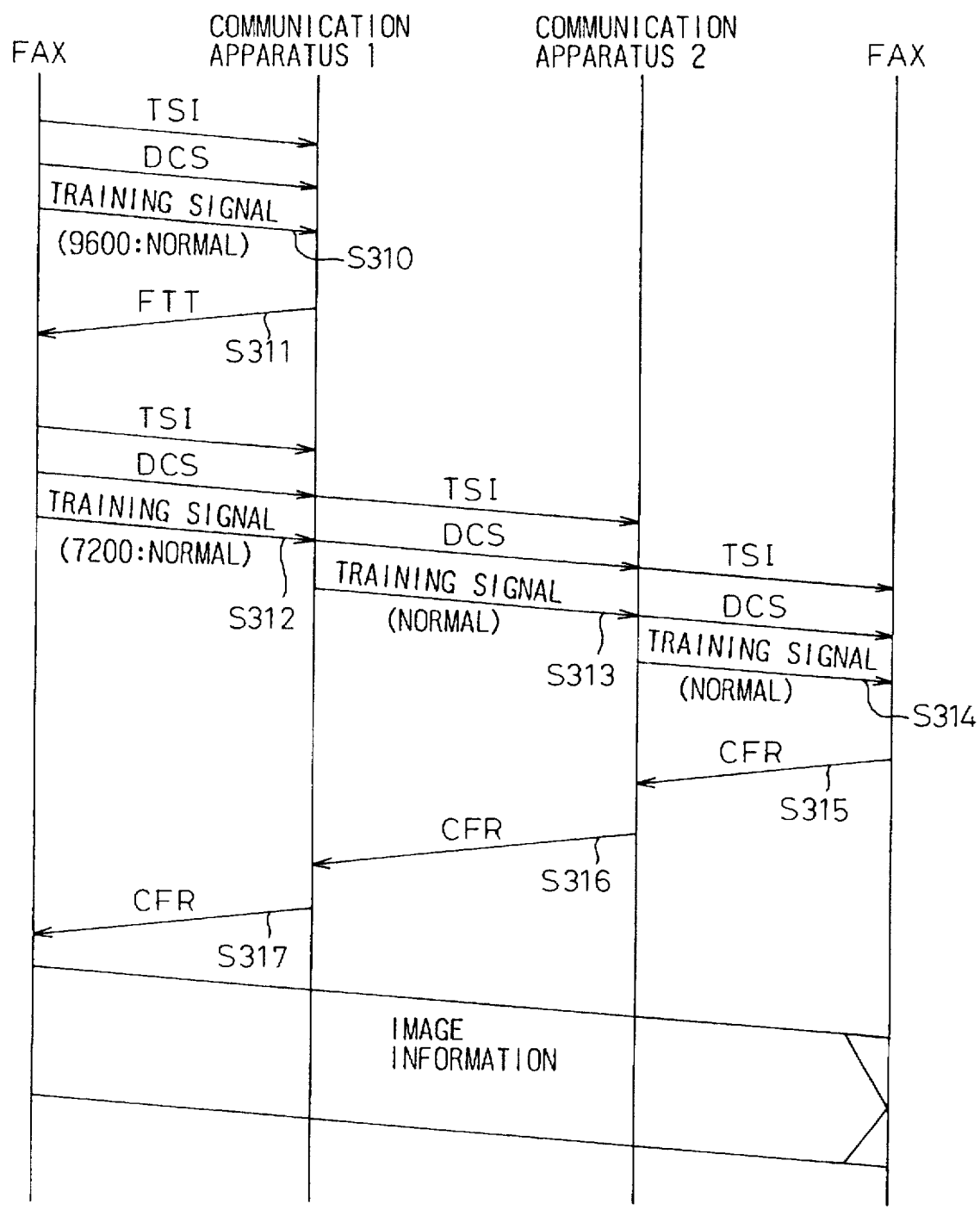
FIG. 14 is a drawing which shows an example of the command sequence in the third embodiment of the present invention.

FIGS. 12 through 14 illustrate the third embodiment of the present invention.

FIG. 12 shows an example of the block diagram configurations of the facsimile command transmitting/receiving processing sections 14 and 23 in this embodiment.

FIG. 13 is a flowchart which shows an example of the processing flow in the command interpreting sections of FIG. 12.

FIG. 14 shows an example of the command sequence in the third embodiment of the present invention.

The third embodiment of the present invention will be described below, with reference made to FIG. 12 and FIG. 13.

The command detecting section 141 recognizes a command sent from the facsimile machine, and when the reception of the command is completed, sends the command to the command interpreting section 142. The command interpreting section 142 tests whether the command is a DCS command, and if it is a command other than a DCS command it sends the command to the command relay transmitting section 144 (S302, S303). If the command is a DCS command the command is sent to the command holding section 143 (S302, S304), the command holding section holding this DCS command.

Thereafter, when the training signal is detected by the command detecting section 141, the ok/bad status of the training signal is sent to the command interpreting section 142 (S301). The accesses the DCS command that had been held in the command holding section 143, performs a check of the image information transmission speed included therein, and, if it judges that it is a communication speed at which its communication apparatus can relay, it sends the training status change as is to the command relay transmitting section 144 (S305 to S307)). If, however, it judges that relaying is not possible, rather than relaying the DCS command, an internal feedback within the machine is used to notify the facsimile command transmitting section 23 that relaying is not possible (S306, S308). When the command interpreting section 232 of the facsimile command transmitting section 23 receives notification that relaying is not possible, the command interpreting section 232 sends an FTT command (training failure) to the command transmitting section 234.

FIG. 14 shows an example of the sequence flow described above. The difference between this and the previously described FIG. 7 is that at the point at which the communication apparatus 1 properly receives a training signal from the facsimile machine (S310), when the judgment is made that it is not possible to relay image information to the communication apparatus 2, the FTT command is returned not to the communication apparatus 2, but rather directly to the facsimile machine (S311). The fallback operation thereafter is the same as was described in relation to FIG. 7, and will not be explained again here.

Figure 15:
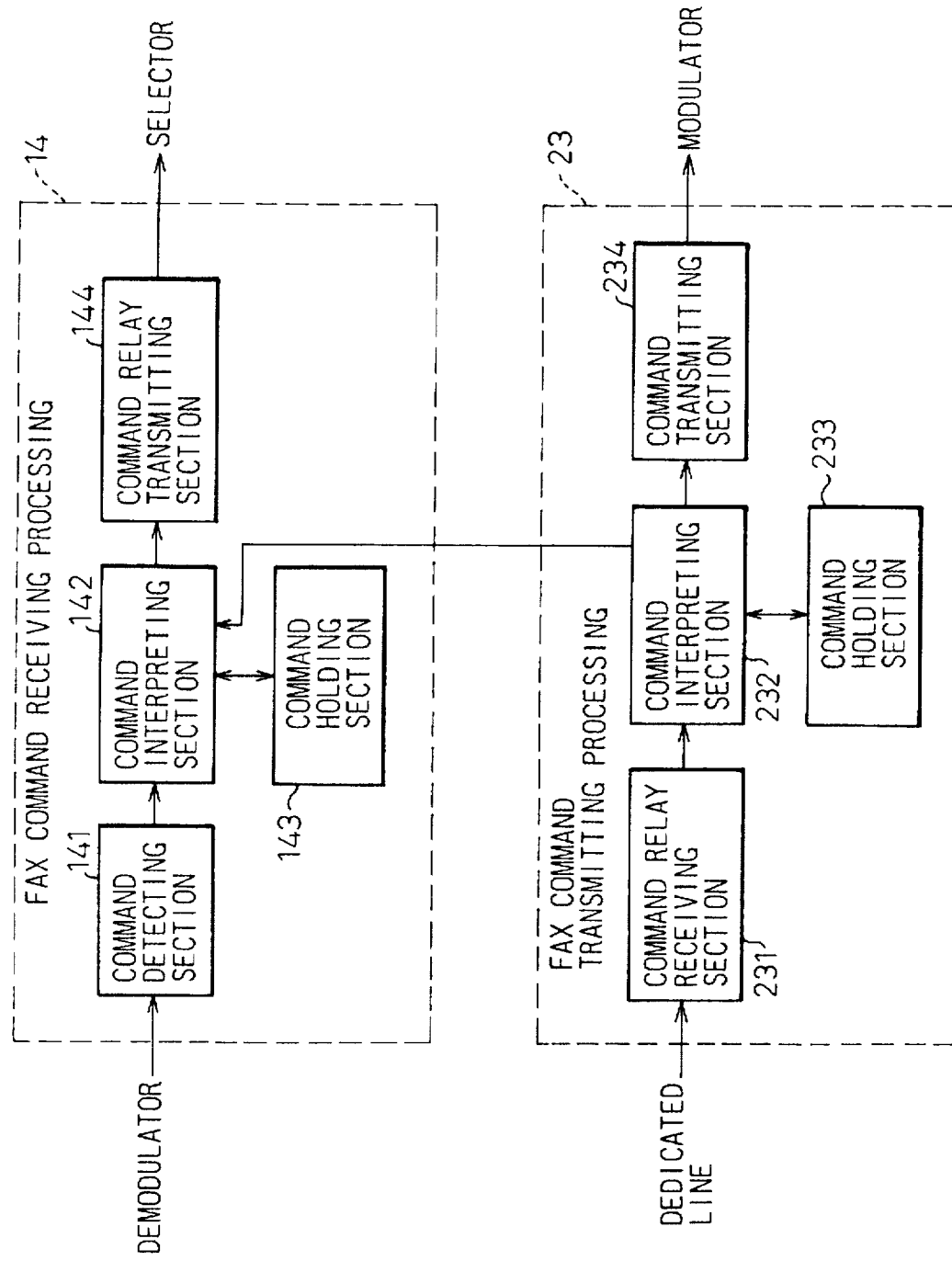
FIG. 15 is a drawing which shows an example of the block diagram configuration of the facsimile command transmitting/receiving processing section of the fourth embodiment of the present invention.
Figure 16:
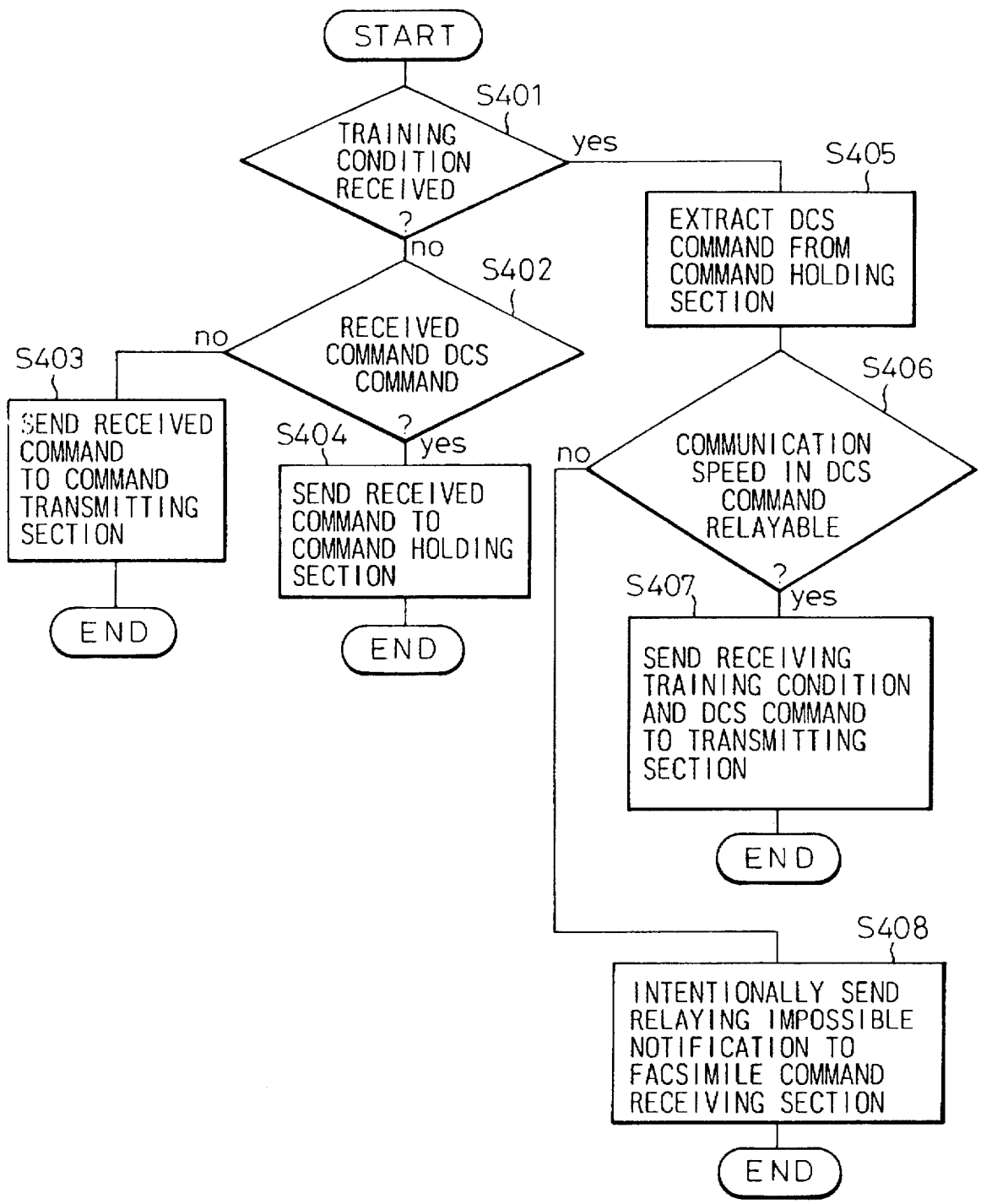
FIG. 16 is a flowchart which shows an example of the processing flow in the command interpreting section of FIG. 15.
Figure 17:
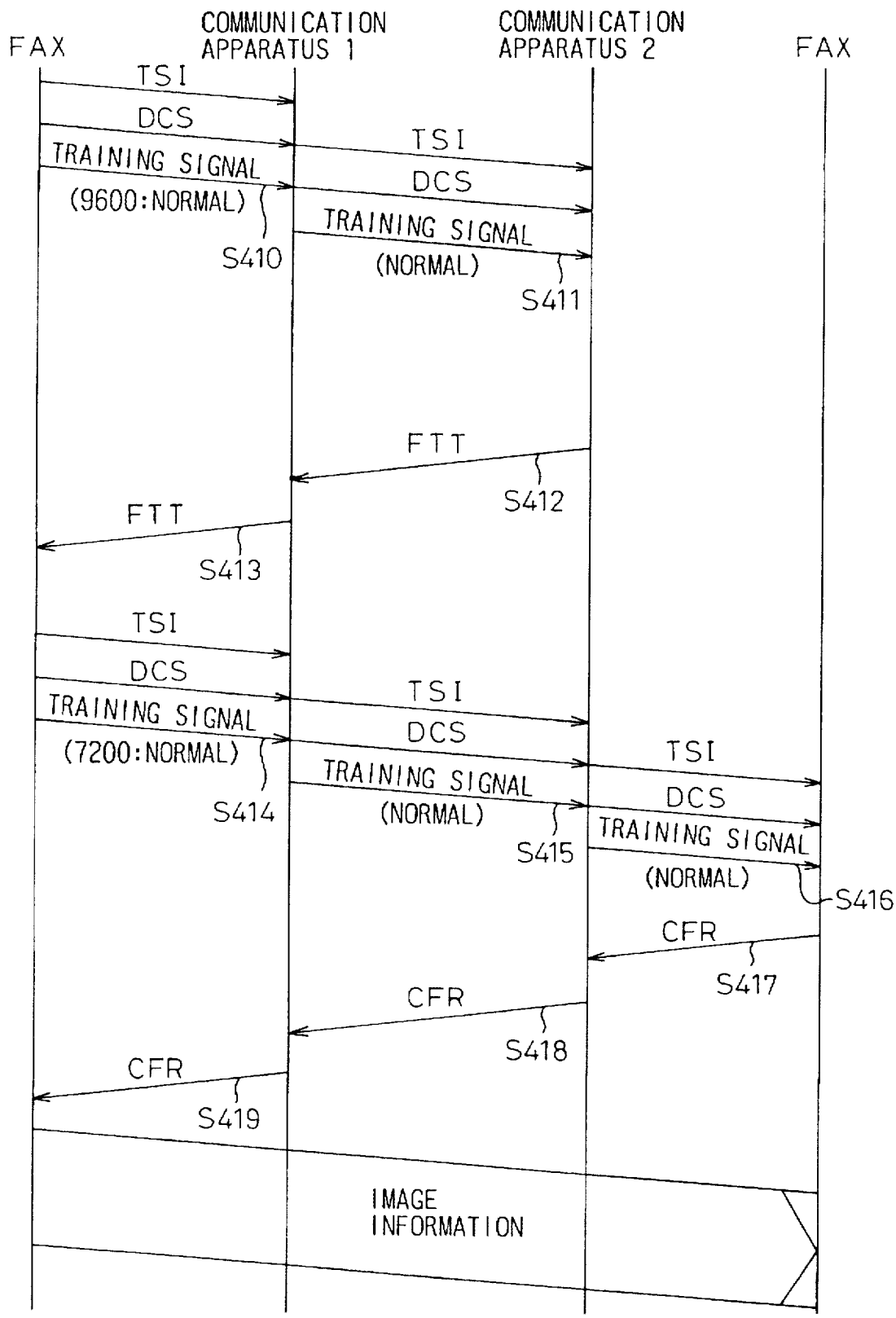
FIG. 17 is a drawing which shows an example of the command sequence in the fourth embodiment of the present invention.

FIGS. 15 through 17 illustrate the fourth embodiment of the present invention.

FIG. 15 shows an example of the block diagram configurations of the facsimile command transmitting/receiving processing sections 14 and 23 in this embodiment.

FIG. 16 is a flowchart which shows an example of the processing flow in the command interpreting sections of FIG. 15.

FIG. 17 shows an example of the command sequence in the fourth embodiment of the present invention.

The fourth embodiment of the present invention will be described below, with reference made to FIG. 15 and FIG. 16.

In the receiving-side communication apparatus 2 a command relayed from the transmitting-side communication apparatus 1 with which it is communicating is recognized by the command relay receiving section 231. When the reception of the command is completed, the command is sent to the command interpreting section 232. The command interpreting section 232 tests whether this command is a DCS command (S202), and if it is a command other than a DCS command, that command is sent to the command transmitting section 234 (S402, S403). If the command is the DCS command, the DCS command is sent to the command transmitting section 234 and also to the command holding section 233, and the command is held by the above-noted command holding section 143 (S402, S404).

After that, when the change in status of the training signal is detected by the command relay receiving section 231, a notification of this is sent to the command interpreting section 232 (S401). The command interpreting section 232 accesses the DCS command that had been held in the command holding section 143, performs a check of the image information transmission speed included therein, and, if it judges that it is a communication speed at which its communication apparatus can relay, it sends the DCS command and the training signal to the command transmitting section 234 (S406 to S408). If, however, the command interpreting section 142 judges that relaying is not possible, an FTT command (training failed) is sent to the command relay transmitting section 144.

FIG. 17 shows an example of the above-noted sequence flow. The difference with respect to the previously described FIG. 7 is that, at the point at which the communication apparatus 1 properly receives a training signal from the facsimile machine (S411), when the judgment is made that it is not possible to relay image information, the FTT command is returned not to the receiving-side facsimile machine but rather to the communication apparatus I which hand sent the training signal (S412). The fallback operation thereafter is the same as was described in relation to FIG. 7, and will not be explained again here FIG. 18 shows an example of the block diagram configuration of a communication processing apparatus according to the fifth embodiment of the present invention.

Figure 18:
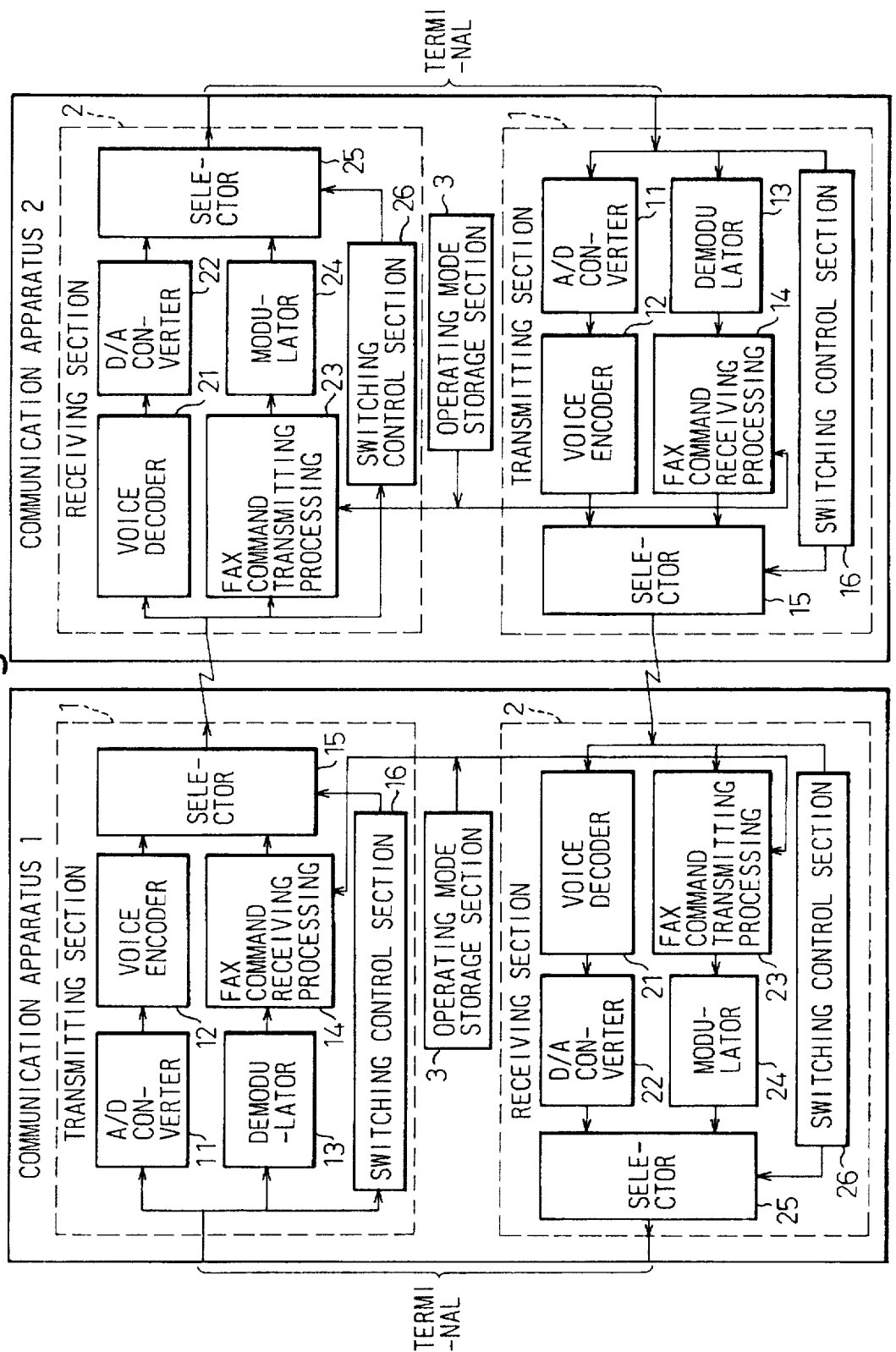
FIG. 18 is a block diagram which shows an example of the configuration of a communication processing apparatus according to the fifth embodiment of the present invention.

In FIG. 18, an operating mode storage section 3 has been added to the configuration which was described in FIG. 5. The operating mode storage section 3 has stored in it in the form of firmware, for example, the details of control for the above-described four embodiments, so that these can be used as directed by an upstream control section. For example, after a DCS command, at the point at which the training signal arrives, the specified mode can be extracted from the operating mode storage section 3, enabling execution of the sequence corresponding to that mode.

Next, the sixth and seventh embodiments of the present invention will be described, in which even if a phase skew develops between commands and responses, caused by the facsimile response time, the delay in the transmission path, and processing delay in the communication apparatus, the protocol between commands and responses is adjusted so as to enable relaying of image information.

Figure 19:
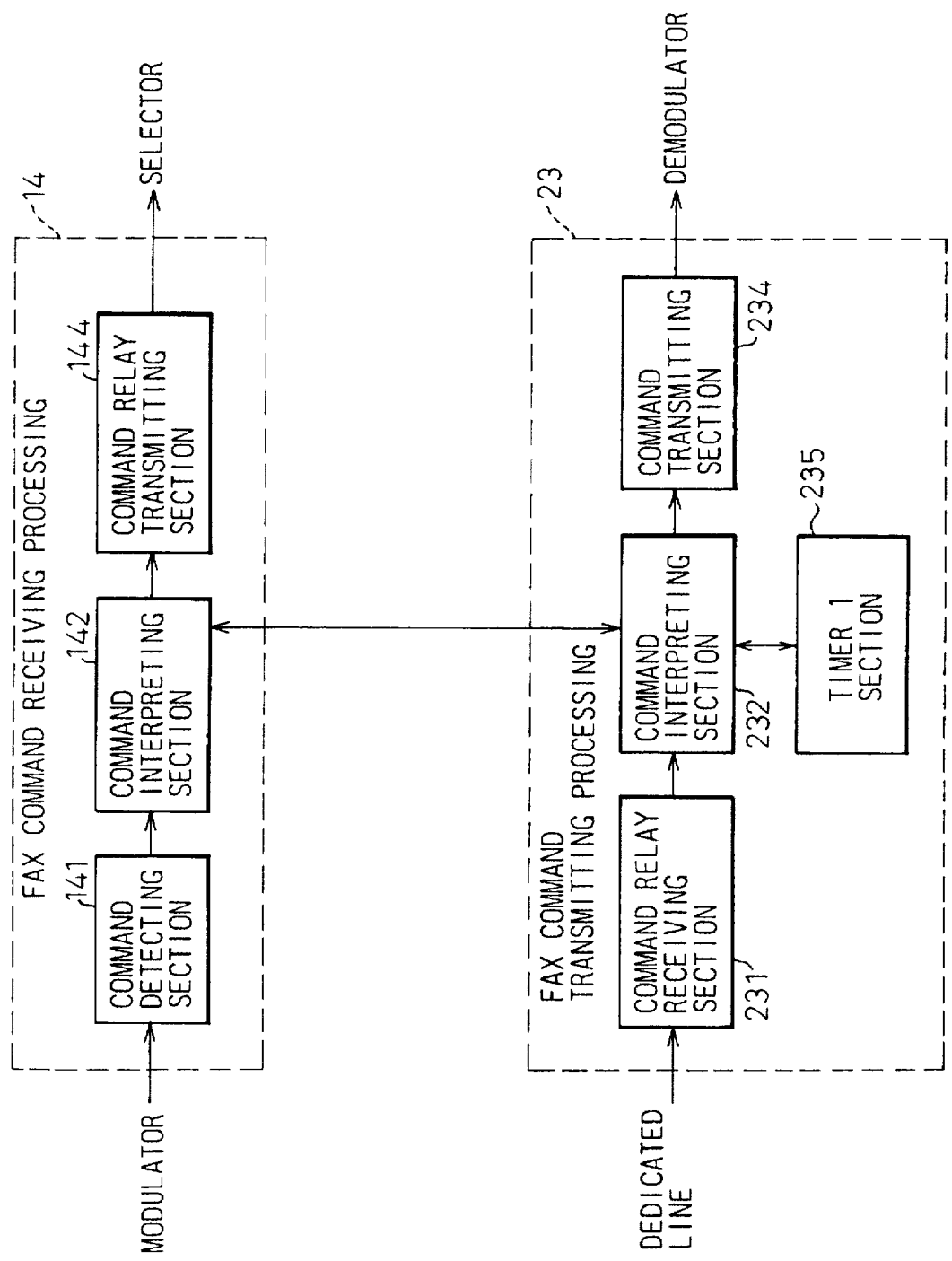
FIG. 19 is a drawing which shows an example of the block diagram configuration of the facsimile command transmitting/receiving processing section of the sixth embodiment of the present invention.
Figure 20:
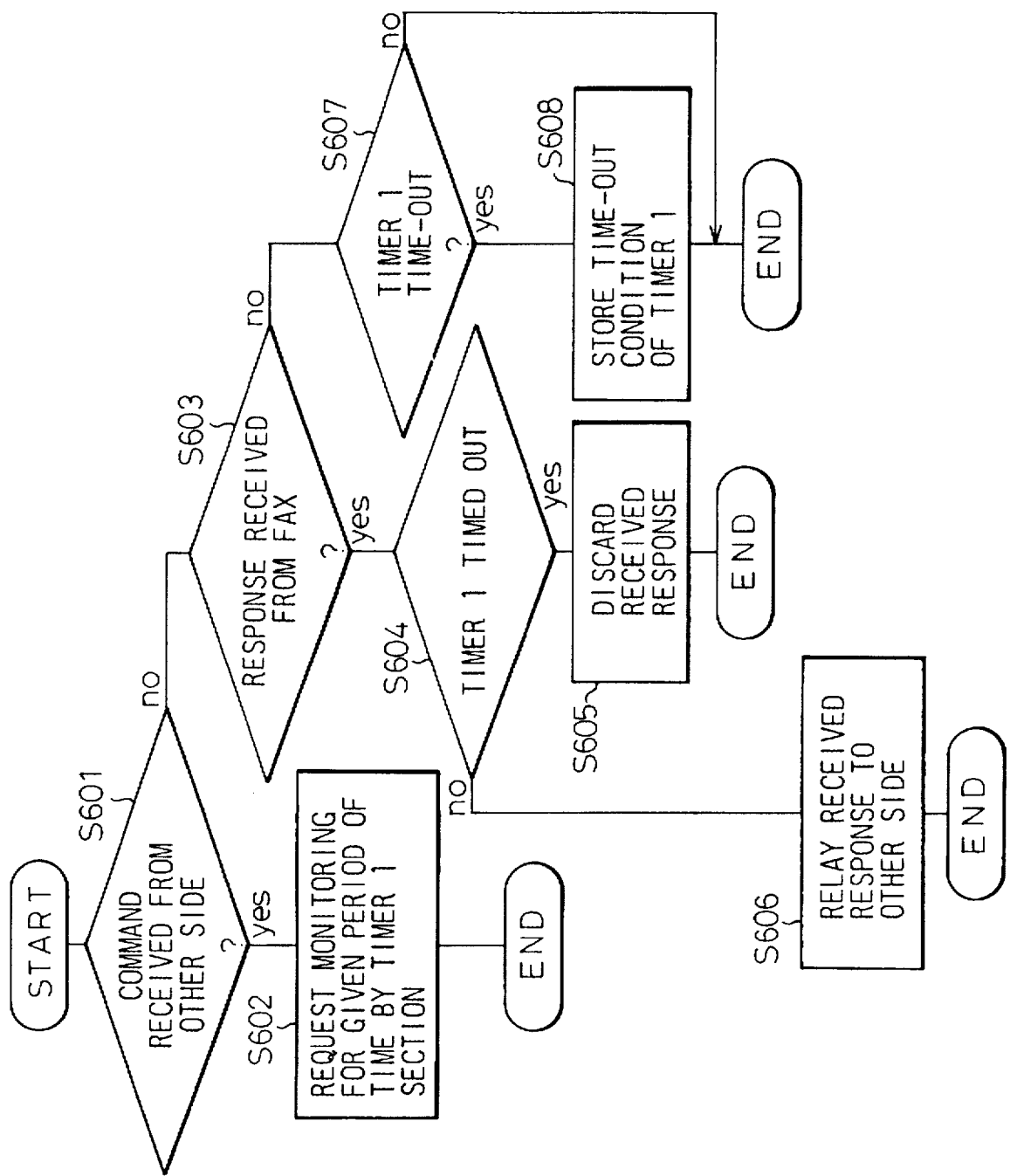
FIG. 20 is a flowchart which shows an example of the command/response processing flow using timer 1.
Figure 21:
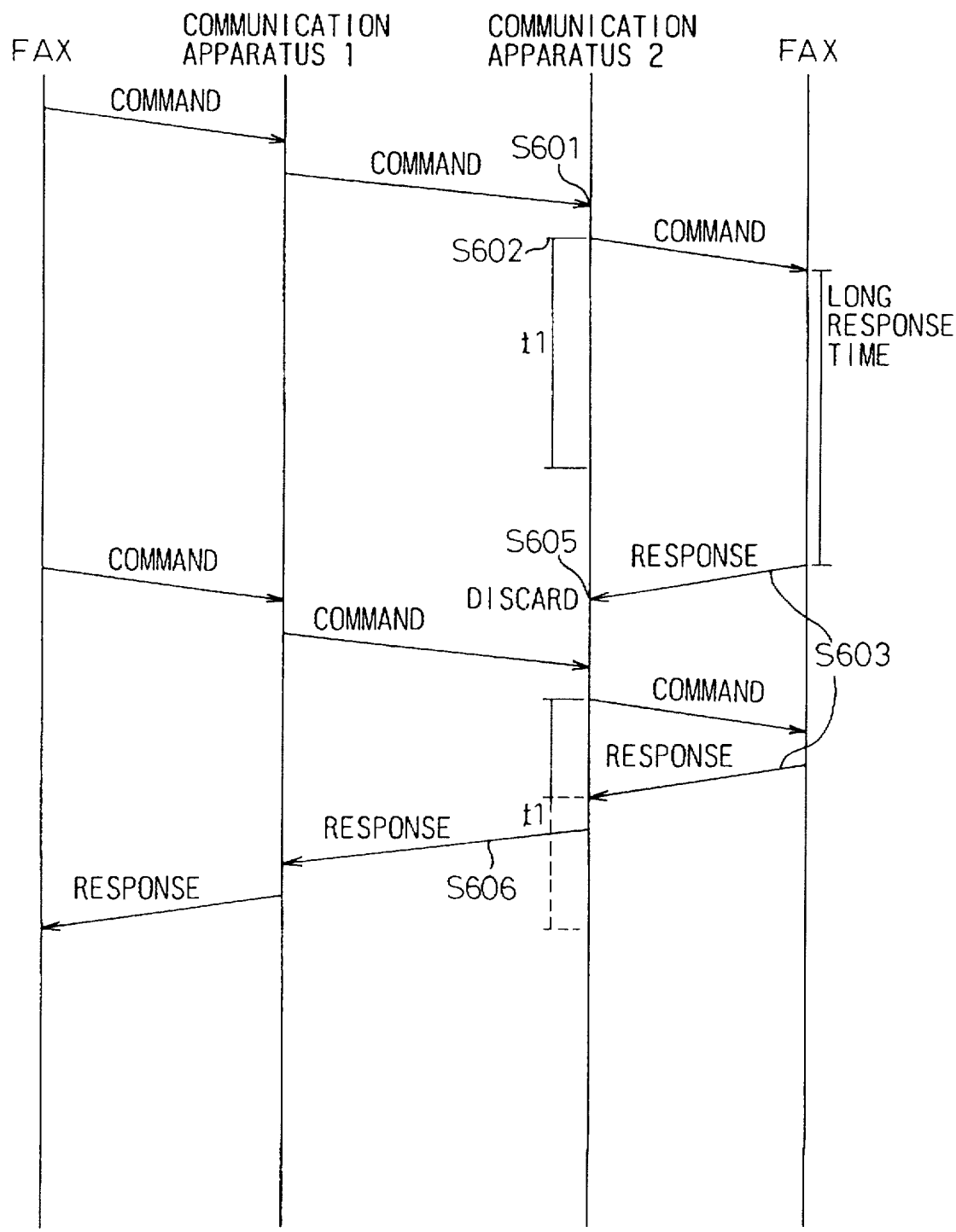
FIG. 21 is a drawing which shows an example of the sequence flow in the sixth embodiment of the present invention.

FIGS. 19 to 21 illustrate the sixth embodiment of the present invention.

FIG. 19 shows an example of the block diagram configurations of the facsimile command transmitting/receiving sections 14 and 12 of FIG. 5.

FIG. 20 is a flowchart which shows an example of the command/response processing flow using timer 1.

FIG. 21 shows an example of the command/response sequence in the sixth embodiment of the present invention.

First, the sixth embodiment of the present invention will be described, making reference to FIG. 19 and FIG. 20.

In the facsimile command receiving section 14 and facsimile command transmitting section 23 of the receiving-side communication apparatus being communicated with, a command received from the transmitting-side communication apparatus via a dedicated line is recognized by the command relay receiving section 231 (S601), and when the reception of the command is completed, the command is sent to the command interpreting section 232. The command interpreting section 232 sends the command to the command transmitting section 234, and also sends a request for monitoring for a prescribed amount of time (t1) to a timer 1 section 235 (S602).

The command transmitting section 234 sends the command received from the command interpreting section 232 to the modulator 24. Thereafter, in the case in which a response is returned from the facsimile machine within the prescribed time (<t1), the response sent from the facsimile machine is recognized by the command detecting section 141 (S603), and when the reception of the response is completed, the received response is sent to the command interpreting section 142. At the command interpreting section 142, the received response is sent to the command relay transmitting section 144, and notification is sent to the command interpreting section 232 that the response was received. The command interpreting section 232 sends a request to the timer 1 section 235 to cancel the monitoring for the prescribed amount of time, and also relays the received response to the communication apparatus of the other side (S606).

In the case in which a response is not returned from the facsimile machine within the prescribed amount of time (>t1), the timer 1 section 235 notifies the command interpreting section 232 that the prescribed amount of time has elapsed. The command interpreting section 232 notifies the command interpreting section 142 of the time-out condition. The command interpreting section 142 discards a response arriving thereafter (S604, S605).

Furthermore, the time-out of the timer 1 is checked without regard to the receipt of commands or responses (S607, S608).

FIG. 21 is an example the above-described sequence flow, in which when the receiving-side communication apparatus sends to the receiving-side facsimile machine a command (S601) received from the other side's transmitting-side communication apparatus, the timer 1 is started (S602). In the case in which the reception of a response from the receiving-side facsimile machine (S603) exceeds the time-out time (>t1) because of a difference in the type of facsimile machine or other trouble (S603), the response signal is discarded at the receiving-side communication apparatus (S605). If, however, the above-noted response is received within the prescribed time-out time t1 of the timer 1 (<t1), the response is sent to the transmitting-side communication apparatus (S606), the timer 1 is cleared, and the counting operating is stopped.

FIGS. 22 through 27 illustrate the seventh embodiment of the present invention.

Figure 22:
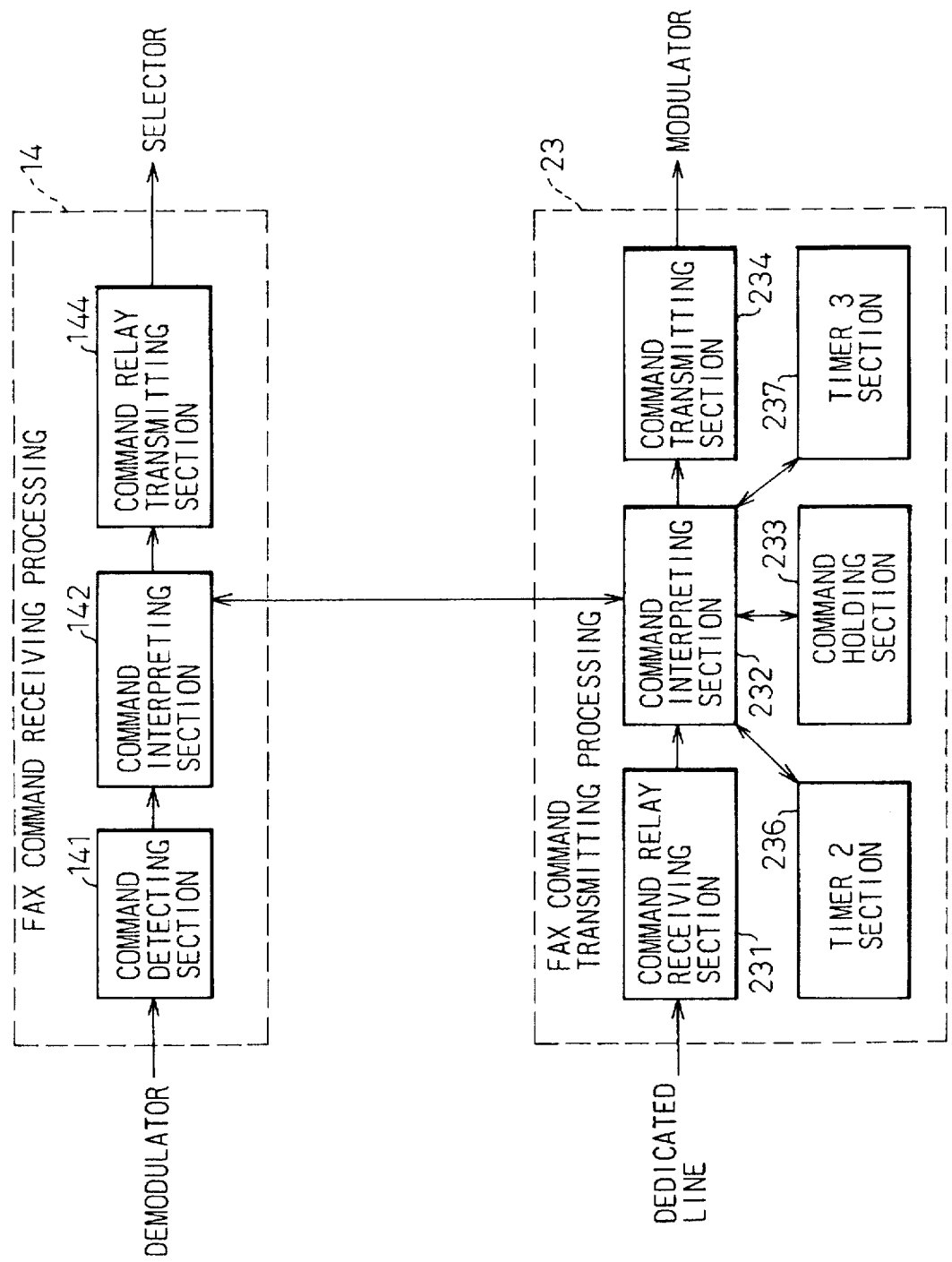
FIG. 22 is a drawing which shows an example of the block diagram configuration of the facsimile command transmitting/receiving processing section of the seventh embodiment of the present invention.

FIG. 22 shows an example of the block diagram configurations of the facsimile command transmitting/receiving sections 14 and 23 shown in FIG. 5.

Figure 23:
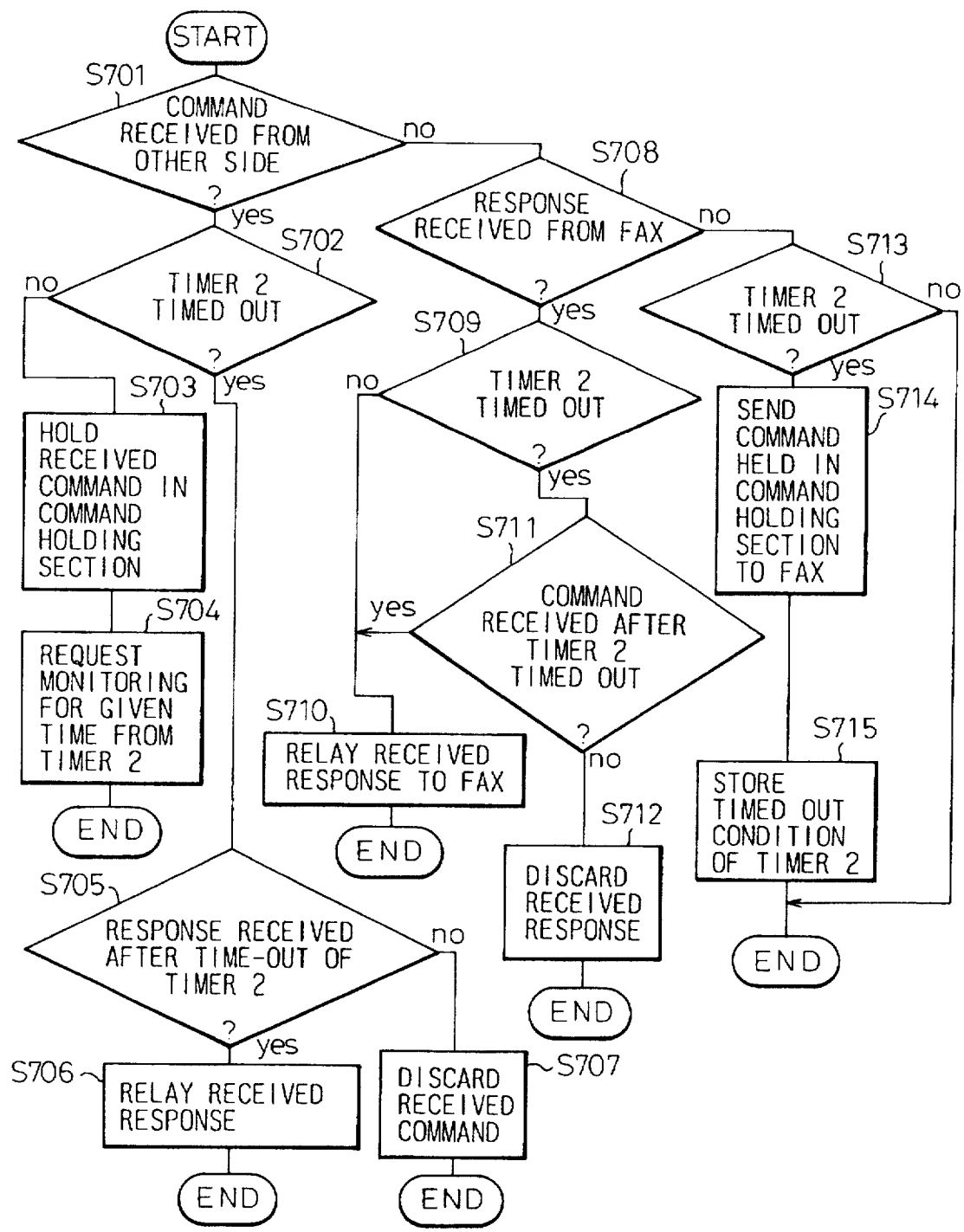
FIG. 23 is a flowchart which shows an example of the command/response processing flow using timer 1.

FIG. 23 is a flowchart which shows an example of the command/response processing flow using timer 2.

Figure 24:
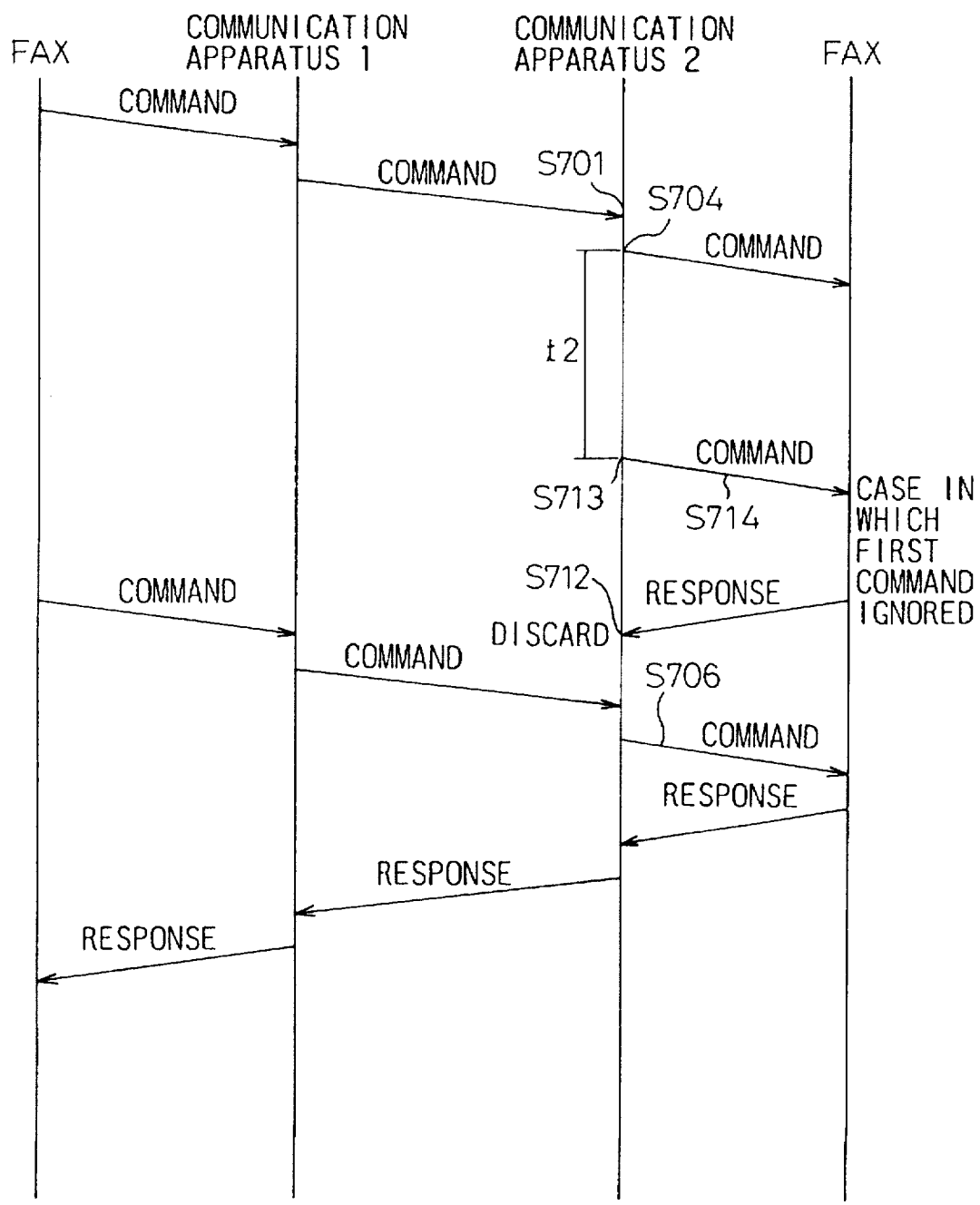
FIG. 24 is a drawing which shows an example (1) of the sequence flow in the seventh embodiment of the present invention.
Figure 25:
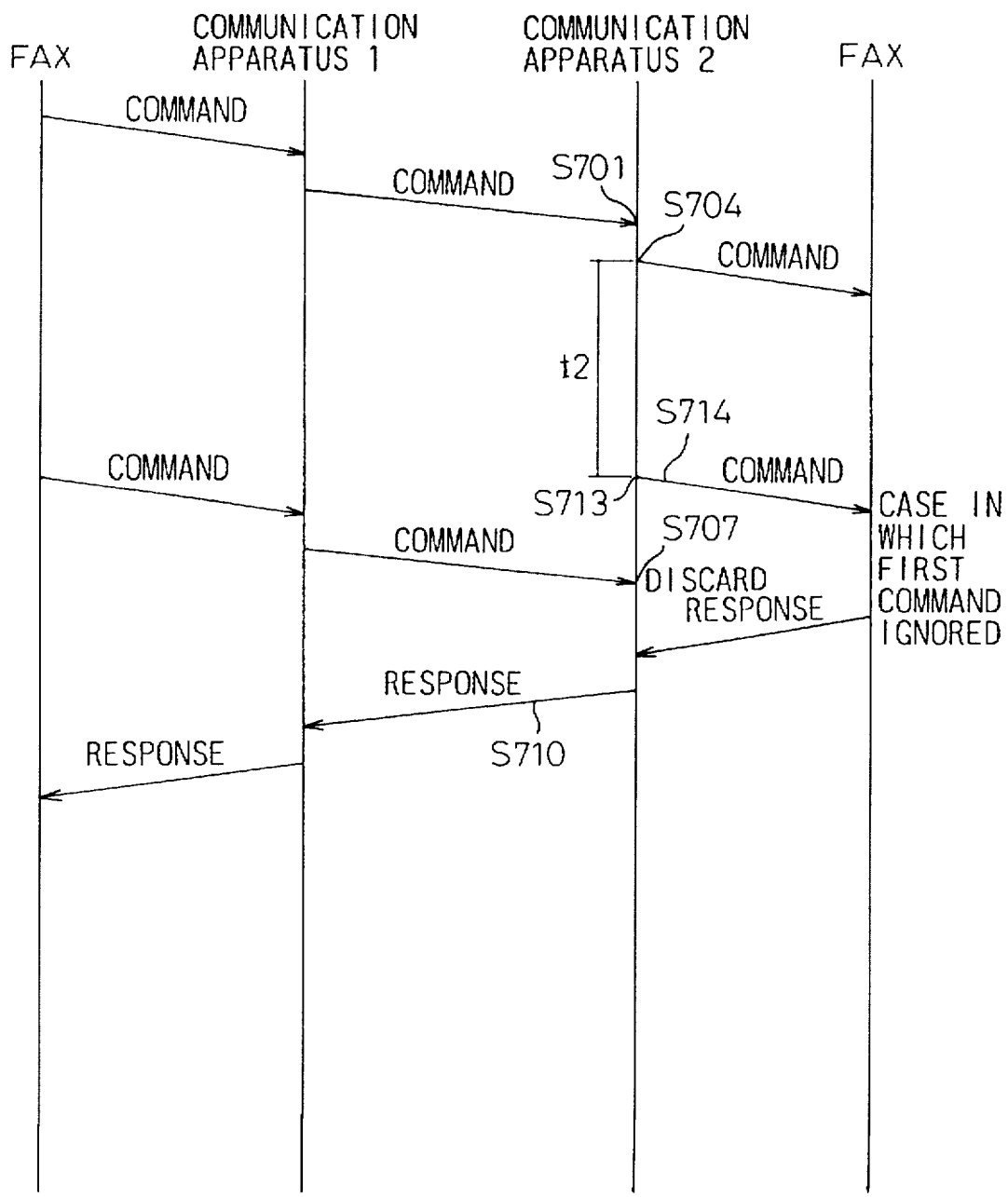
FIG. 25 is a drawing which shows an example (2) of the sequence flow in the seventh embodiment of the present invention.

FIG. 24 and FIG. 25 each show examples of the command/response sequence in the seventh embodiment of the present invention using timer 2 as shown in FIG. 23.

Figure 26:
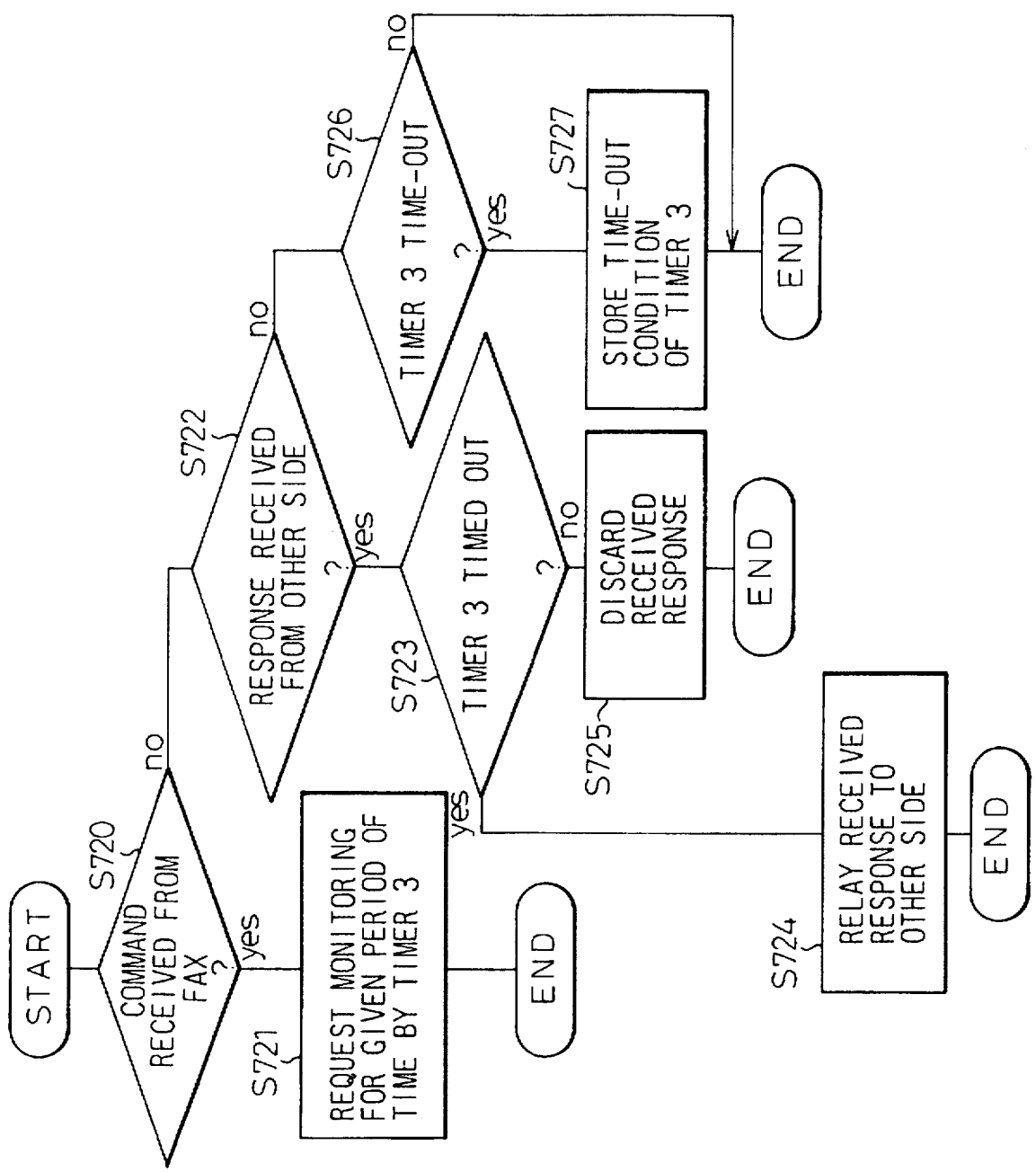
FIG. 26 is a flowchart which shows an example of the command/response processing flow using timer 3.

FIG. 26 shows an example of the command/response processing flow using timer 3.

Figure 27:
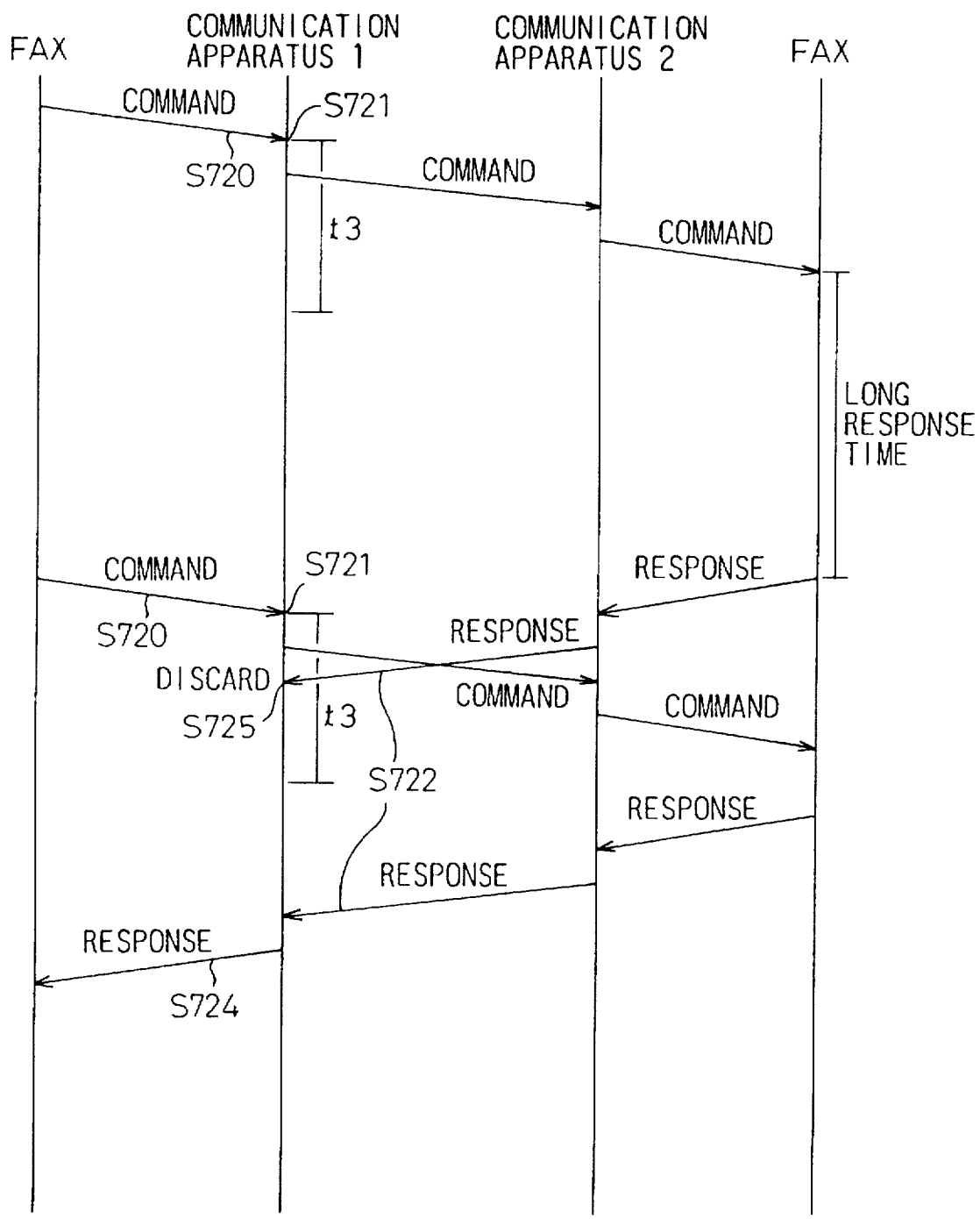
FIG. 27 is a drawing which shows an example (3) of the sequence flow in the seventh embodiment of the present invention.

FIG. 27 shows an example of the command/response sequence in the seventh embodiment of the present invention using timer 3 as shown in FIG. 26.

The seventh embodiment of the present invention for the case of using timer 2 will be described below, with reference made to FIG. 22 and FIG. 23.

In the facsimile command receiving section 14 and facsimile command transmitting section 23 of the receiving-side communication apparatus being communicated with, a command received from the transmitting-side communication apparatus via a dedicated line is recognized by the command relay receiving section 231 (S701), and when the reception of the command is completed, the command is sent to the command interpreting section 232. The command interpreting section 232 sends the command to the command holding section 233 and also to the command transmitting section 234, and also sends a request for monitoring for a prescribed amount of time (t2) to a timer 2 section 235 (S702). The command holding section holds the command that is sent to it from the command interpreting section 232 (S703).

Thereafter, when a response is returned within the prescribed amount of time from a facsimile machine that had received a command (<t2), that response is recognized by the command detecting section 141 (S708), and when the reception of the response is completed, the received response is sent to the command interpreting section 142. At the command interpreting section 142, the received response is sent to the command relay transmitting section 144 and a notification that a response has been received from the facsimile machine is sent to the command interpreting section 232. The command interpreting section 232 sends a request to the timer 2 section 236 to cancel the monitoring for the prescribed amount of time, and also relays the received response to the communication apparatus with which communication is being performed (S710).

If, however, a response is not returned from the facsimile machine with the prescribed amount of time (>t2), the timer 2 section 236 sends notification to the command interpreting section 232 that the prescribed amount of time has elapsed. The command interpreting section 232 notifies the command interpreting section 142 of the time-out condition, and sends a request to the command holding section 233 for the held command. The command accessed from the holding section 233 is sent once again to the modulator 24 (S713, S714).

Thereafter, in the case in which a response sent from the facsimile machine is received (S708, S709), the command detecting section 141 recognizes the command, and when the reception of the response is completed, the received response is sent to the command interpreting section 142. At the command interpreting section 142, if there had been notification from the other side's communication apparatus of the receipt of a command retry, this response is discarded (S711, S712), and a notification of the receipt of the response from the facsimile machine is given to the command interpreting section 232. If there had been notification from the other side's communication apparatus of the receipt of a command retry, this response is sent to the command relay transmitting section 144 (S711, S710).

In the case in which a retried command is received independently (S701, S702) from the other side's communication apparatus after a retry command transmission (S714), the command is recognized at the command relay receiving section 231, and when the reception of the command is completed, the received command is sent to the command interpreting section 232. At the command interpreting section 232, if there had been notification from the facsimile machine of the receipt of a response, that command is discarded (S705, S707), and a notification of the receipt of the command retry from the other communication apparatus is sent to the command interpreting section 142. In the case in which a response had already received, the received command is sent to the receiving side facsimile machine (S705, S706).

FIG. 24 and FIG. 25 show examples of the above-noted sequence flow, these showing the case in which the receiving-side facsimile machine judges that the reception of the same command two times in a row is normal reception. Therefore, at first the timer 2 times out and the same command is resent from the receiving-side communication apparatus (S713, S714).

In the example shown in FIG. 24, after the above-noted resending of the command, the case in which a response is received from the receiving-side facsimile terminal before the retry command is received from the transmitting side, in which case the response is discarded (S711, S712), and the retry command is sent once again to the transmitting-side facsimile machine (S705, S706).

The example shown in FIG. 25 is that of the case in which, after resending of a command, a response is received from the transmitting-side facsimile machine after a retry command is received from the transmitting side. In this case, in contrast to the above, the command is discarded (S705, S707), and the above-noted response is sent to the other communication apparatus (S711, S710).

Next, the seventh embodiment of the present invention will be described for the case in which the timer 3 section 237 is used in the command/response processing flow shown in FIG. 26.

In the transmitting-side communication apparatus on the other side, in the case in which a command is received from the calling facsimile machine, the command is recognized at the command detecting section 141 (S720), and when the reception of the command is completed, the received command is sent to the command interpreting section 142. At the command interpreting section 142, a notification of the receipt of the command from the facsimile is made with respect to the command interpreting section 232, and the received command is sent to the command relay transmitting section 144.

At the command interpreting section 232, a request is made of the timer 3 section 237 to perform monitoring for a prescribed amount of time (t3) (S721). In the case in which the time of the timer 3 section 237 exceeds the prescribed time (>t3), notification of the time-out condition is made to the command interpreting section 232. At the command interpreting section 232, this is the case in which a response has been received, and when notification had already been received of the time-out from the timer 3 section 237, the received response is sent to the command transmitting section 234 (S722 to S724). If the time-out notification has not yet been received, this response is discarded (S723, S725).

FIG. 27 is a sequence flowchart which shows the above-described sequence. It shows the case in which the response from the receiving-side facsimile machine is delayed, during which time the command is resent from the transmitting-side facsimile machine (S702). In this embodiment of the present invention, upon the receipt of a command from the transmitting-side facsimile machine the response monitoring timer 3 of the transmitting side of the other communication apparatus is started (S721). The time t3 is set to a short time, during which it is not possible for a normal receiving-side facsimile machine to return a response. Therefore, a response received during this time period is discarded (S725), and a response received after this time t3 is sent to the receiving-side facsimile machine.

Because of the many possible causes of faults, including the facsimile machine, the public communication lines, the communication apparatus, and the dedicated relay line, troubleshooting can take a great deal of time and there can be insufficient information to perform such troubleshooting. In addition, there is the problem of the finite memory capacity for holding trace data, making it difficult to collect the desired data, and resulting in overwriting of data. The eighth embodiment of the present invention, which is described below, solves these problems, enabling a reduction in the amount of time required for troubleshooting the causes of faults and performing experiments which replicate faults.

FIGS. 28 through 41 illustrate the eighth embodiment of the present invention.

Figure 28:
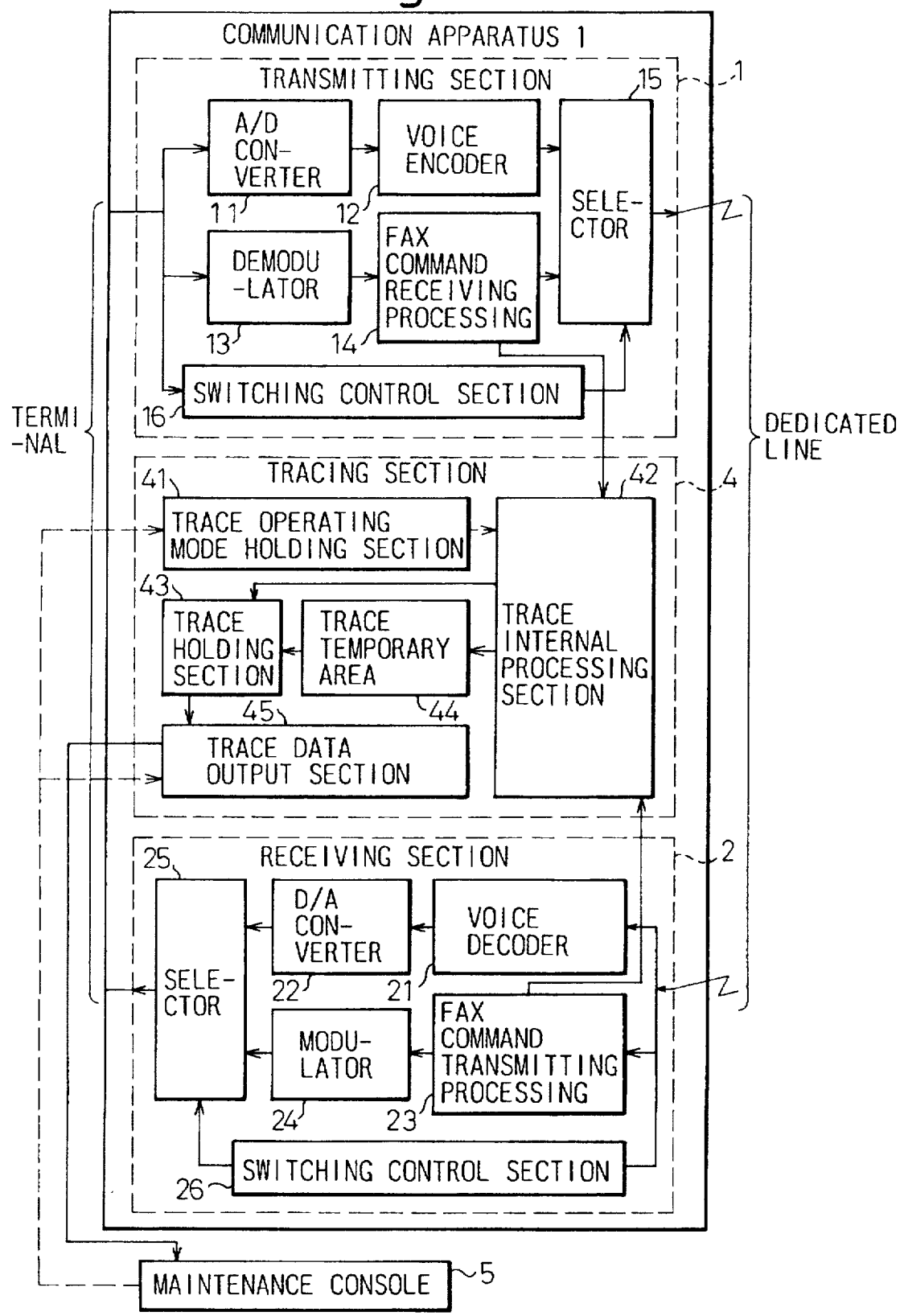
FIG. 28 is a block diagram which shows an example of the configuration of one end of the other-side communication apparatus which implements a facsimile signal relay method according to the eighth embodiment of the present invention.

FIG. 28 shows an example of the configuration of this embodiment, in which a tracing section has been added within the communication apparatus 1 shown in FIG. 5.

Figure 29:
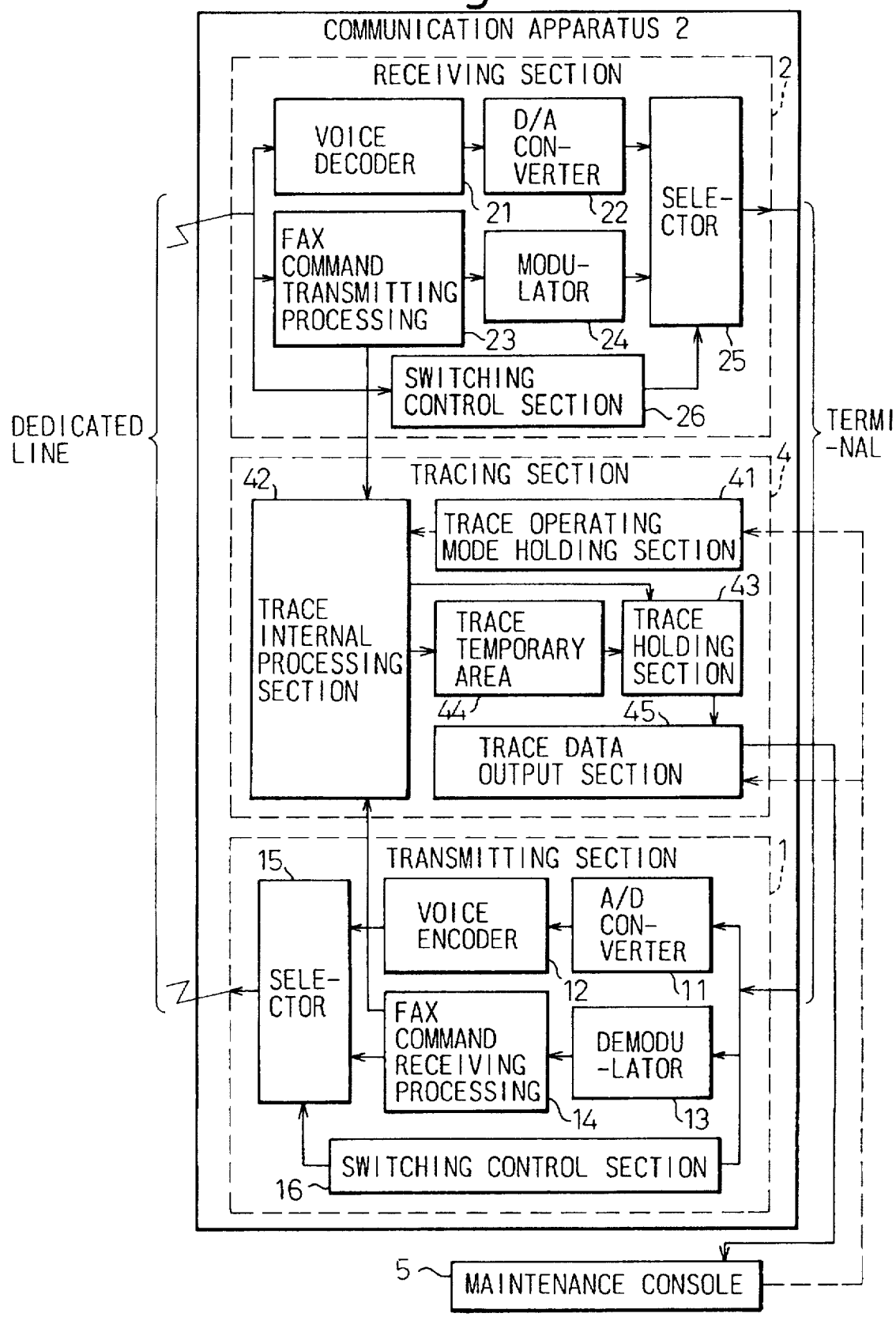
FIG. 29 is a block diagram which shows an example of the configuration of the other end of the other-side communication apparatus which implements a facsimile signal relay method according to the eighth embodiment of the present invention.

FIG. 29 shows an example of the configuration of this embodiment, in which an additional tracing section is provided within the communication apparatus 2 on the other side from the above-noted communication apparatus 1.

In FIG. 28 and FIG. 29, commands which cause a shift to the trace operating mode, as well as the telephone number for tracing are sent from the maintenance console to the trace operating mode holding section 41. The trace operating mode holding section 41 holds these items.

Figure 32:
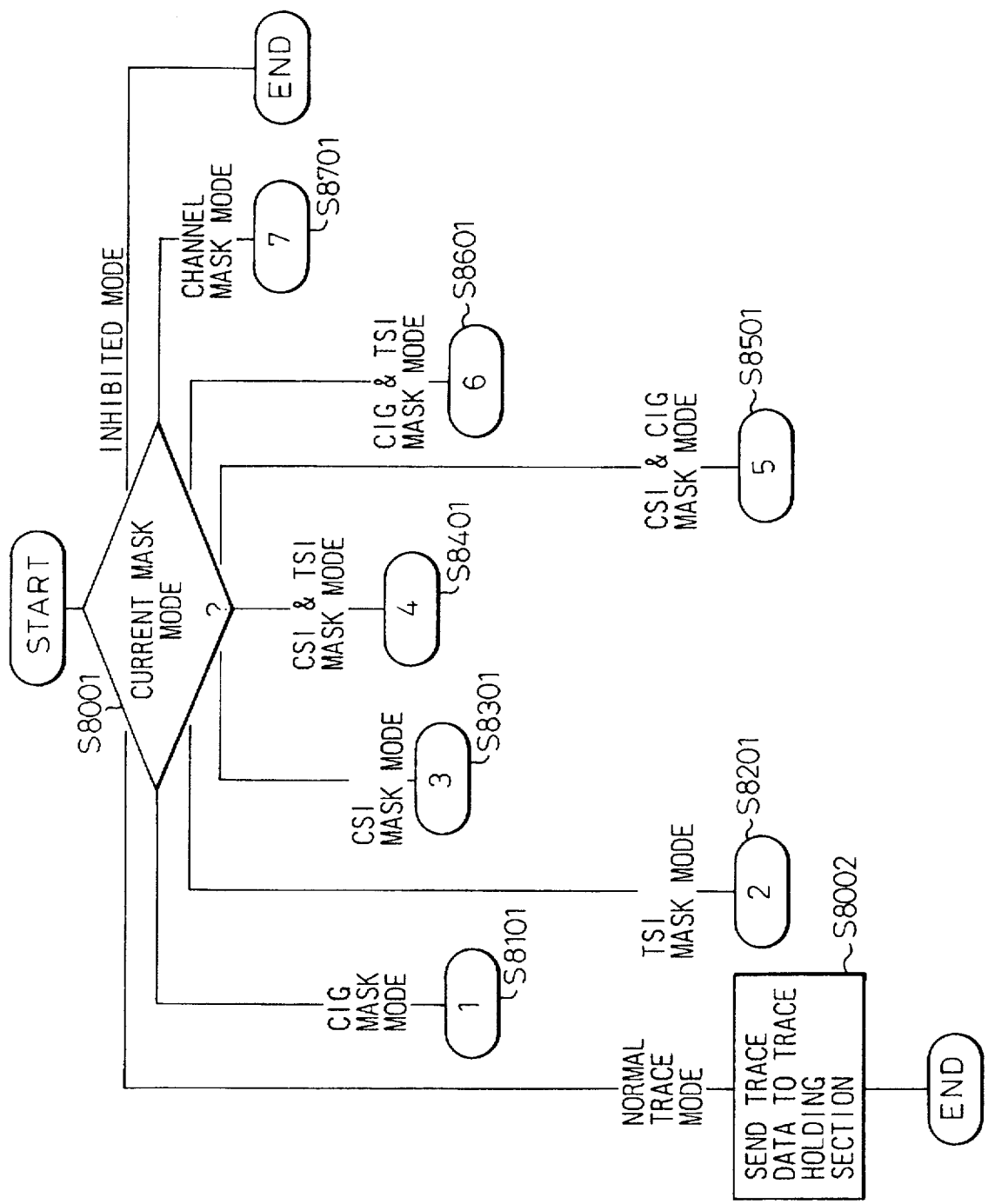
FIG. 32 is a flowchart which shows an example of the trace operating mode selection processing.

FIG. 32 shows the types of trace operating modes than can be specified in this embodiment of the present invention.

a) The normal trace mode is the mode in which all trace data is unconditionally held.

b) The mask mode (1) according to CSI (called subscriber identification) is a mode in which trace data is held in the case of coincidence between a set telephone number and the telephone number included in a CSI command.

c) The mask mode (2) according to TSI (transmitting subscriber identification) is a mode in which trace data is held in the case of coincidence between a set telephone number and the telephone number included in a TSI command.

d) The mask mode (3) according to CIG (calling subscriber identification) is a mode in which trace data is held in the case of coincidence between a set telephone number and the telephone number included in a CIG command.

e) The mask mode (4) according to CSI and TSI is a mode in which trace data is held in the case of coincidence between a set telephone number and the telephone numbers included in both a CSI command and a TSI command.

f) The mask mode (5) according to CSI and CIG is a mode in which trace data is held in the case of coincidence between a set telephone number and the telephone numbers included in both a CSI command and a CIG command.

g) The mask mode (6) according to CIG and TSI is a mode in which trace data is held in the case of coincidence between a set telephone number and the telephone numbers included in both a CIG command and a TSI command.

h) The mask mode (7) according to a channel number is a mode in which trace data is held in the case in which there is coincide of the channel number.

i) The tracing inhibited mode is a mode in which the holding of trace data is prohibited.

The above-noted mask modes can be used in the following examples.

<1> The case in which a communication problem exists with a specific facsimile transmitter, in which case the mask is applied by a TSI command and trace data is collected.

<2> The case in which a communication problem exists with a specific facsimile receiver, in which case the mask is applied by a CSI command and trace data is collected.

<3> The case in which a communication problem exists between a specific combination of facsimile transmitter and facsimile receiver, in which case the mask is applied by the CSI and TSI commands and trace data is collected.

<4> The case in which a communication problem exists with a specific facsimile receiver when polling communication is performed, in which case the mask is applied by the CIG command and trace data is collected.

<5> The case in which a communication problem exists with a specific facsimile transmitter when polling communication is performed, in which case the mask is applied by the TSI command and trace data is collected.

<6> The case in which a communication problem exists with a specific combination of facsimile transmitter and facsimile receiver when polling communication is performed, in which case the mask is applied by the CIG and TSI commands and trace data is collected.

<7> The case in which a communication problem exists with a specific combination of facsimile transmitter and facsimile receiver when polling communication is performed, in which case the mask is applied by the CSI and TSI commands and trace data is collected.

<8> The case in which a communication problem exists with a specific physical channel, in which case the mask is applied by the channel number and trace data is collected.

<9> The case in which tracing is inhibited at the point at which trace data is collected, thereby preventing the overwriting of the trace data.

<10> The case in which the communication to be collected are longer than would be holdable in the trace holding section memory capacity, in which case the realtime display function is used, enabling capture of the entire protocol from beginning to end by downloading.

Figure 30:
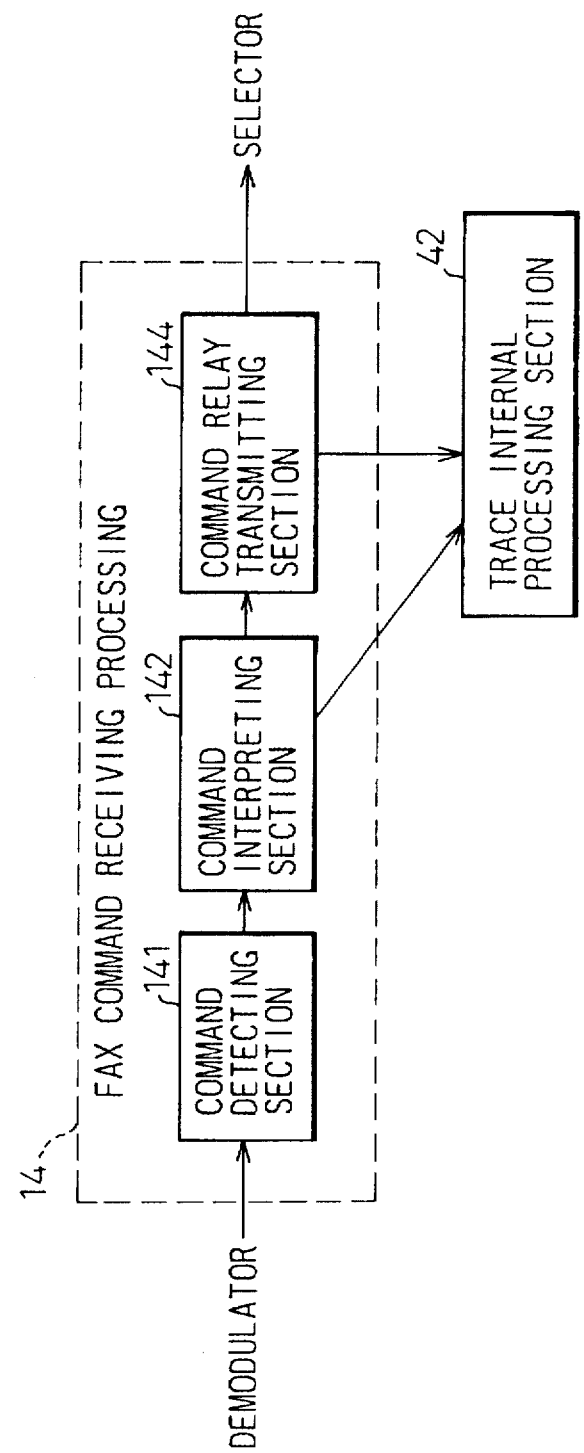
FIG. 30 is a block diagram which shows the relationship between the facsimile command receiving processing section and the trace internal processing section in the eighth embodiment of the present invention.

FIG. 30 shows the block diagram configuration of the FAX command receiving processing section 14 of the transmitting section 1, with relation to the trace internal processing section 42.

Figure 31:
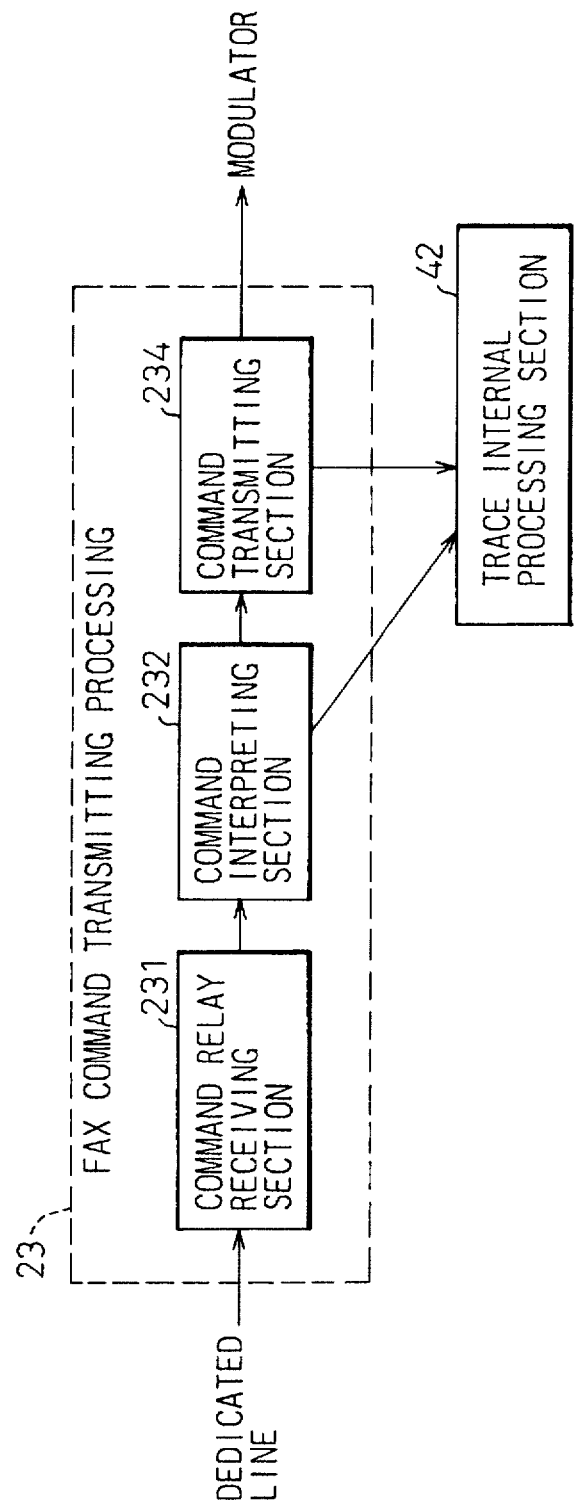
FIG. 31 is a block diagram which shows the relationship between the facsimile command transmitting processing section and the trace internal processing section in the eighth embodiment of the present invention.

FIG. 31 shows the block diagram configuration of the FAX command transmitting processing section 14 of the transmitting section 1, with relation to the trace internal processing section 42.

As shown in FIG. 30, in the trace operating mode, a command sent by a facsimile machine connected to the local station is recognized by the command detecting section 141, and when the reception of the command is completed, the received command is sent to the command interpreting section 142. The command interpreting section 142 sends the command to the command relay transmitting section 144, and simultaneous sends the command to the trace internal processing section 42. The command relay transmitting section 144 sends the actually transmitted command to the trace internal processing section 42.

In the same manner, in FIG. 31, a command sent from the other side's communication apparatus is recognized by the command relay receiving section 231, and when the reception of the command is completed, the received command is sent to the command interpreting section 232. The command interpreting section 232 sends the command to the command transmitting section 234, and also simultaneously sends the command to the trace internal processing section 42. The command transmitting section 234 sends the actually transmitted command to the trace internal processing section 42.

Next, the operation of the eighth embodiment of the present invention will be explained in accordance with the operational processing flowcharts of FIGS. 32 through 39, making reference to each of the block diagrams of FIG. 28 an FIG. 29. The 8 in the most significant digit of the step numbers in these flowcharts indicates the eighth embodiment, with the numbers in the following digit corresponding to the number of the individual trace operating modes.

Figure 33:
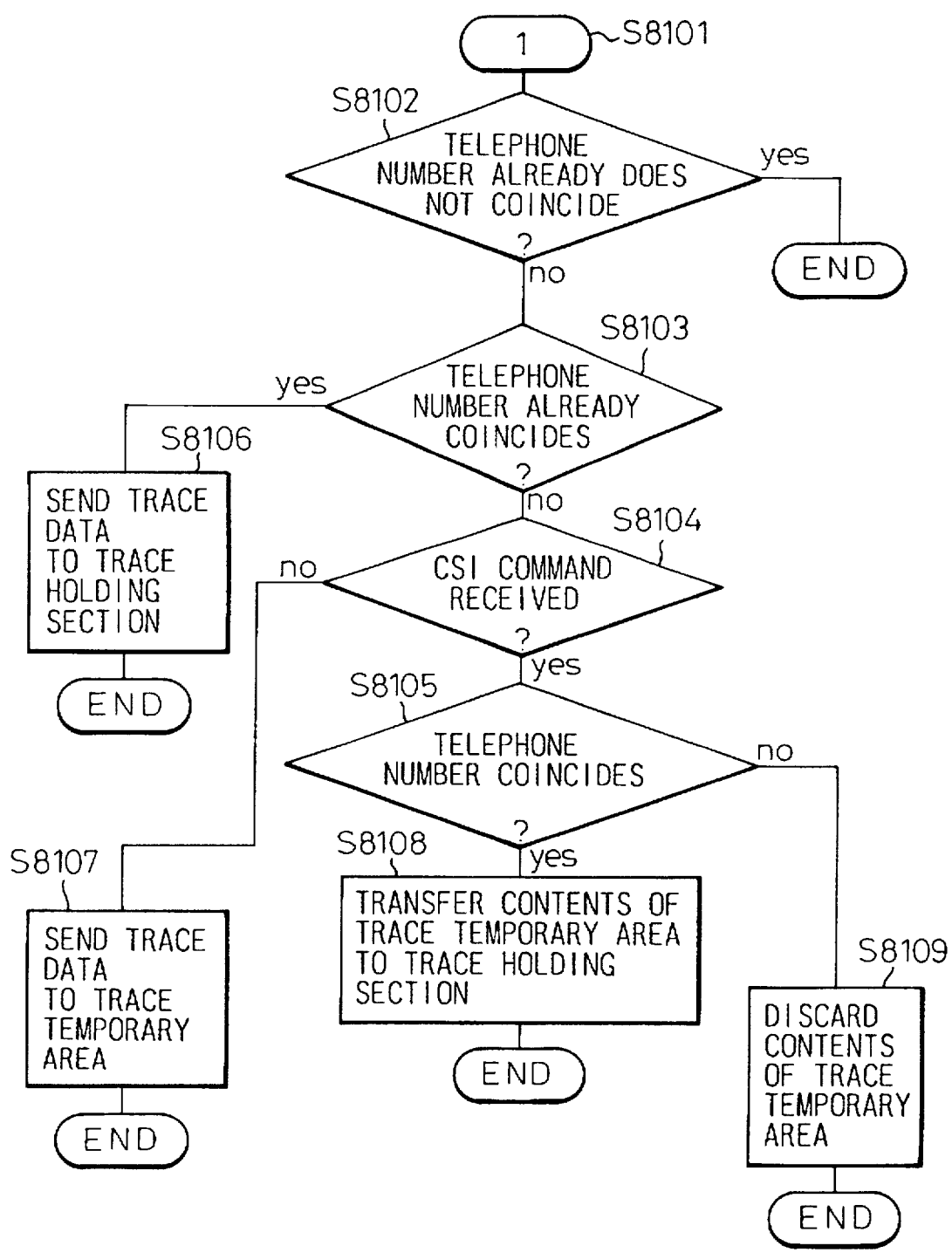
FIG. 33 is a flowchart which shows an example of the CSI mask mode processing flow.

FIG. 33 shows the processing flow for the CSI mask mode (1). In this mode, in the case in which the telephone number held in the trace operating mode holding section 41 coincides with the telephone number which is added to a parameter of the CSI command, the trace data held in the trace temporary area 44 is transferred to the trace holding section 43.

In FIG. 33, if the trace internal processing section 42 has already recognized the condition of coincidence of the telephone number, the related trace data is sent to the trace holding section 43 (S8103, S8106). If the telephone number coincidence condition has not yet been recognized, a judgment is made whether the command is a CSI command, and if it is a command other than a CSI command trace data is stored into the trace temporary area 44 (S8104, S8107).

If the command is a CSI command, a comparison is performed between the telephone number appended to its parameter and the telephone number held in the trace operating mode holding section 41. If these numbers are different, the trace data held in the trace temporary area 44 is discarded, after which tracing is not performed until a return to the voice mode (S8105, S8109). If the numbers coincide, the trace data which is held in the trace temporary area 44 is transferred to the trace holding area 43, after which trace data is stored into the trace holding section 43 until return to the voice mode (S8105, S8108).

Figure 34:
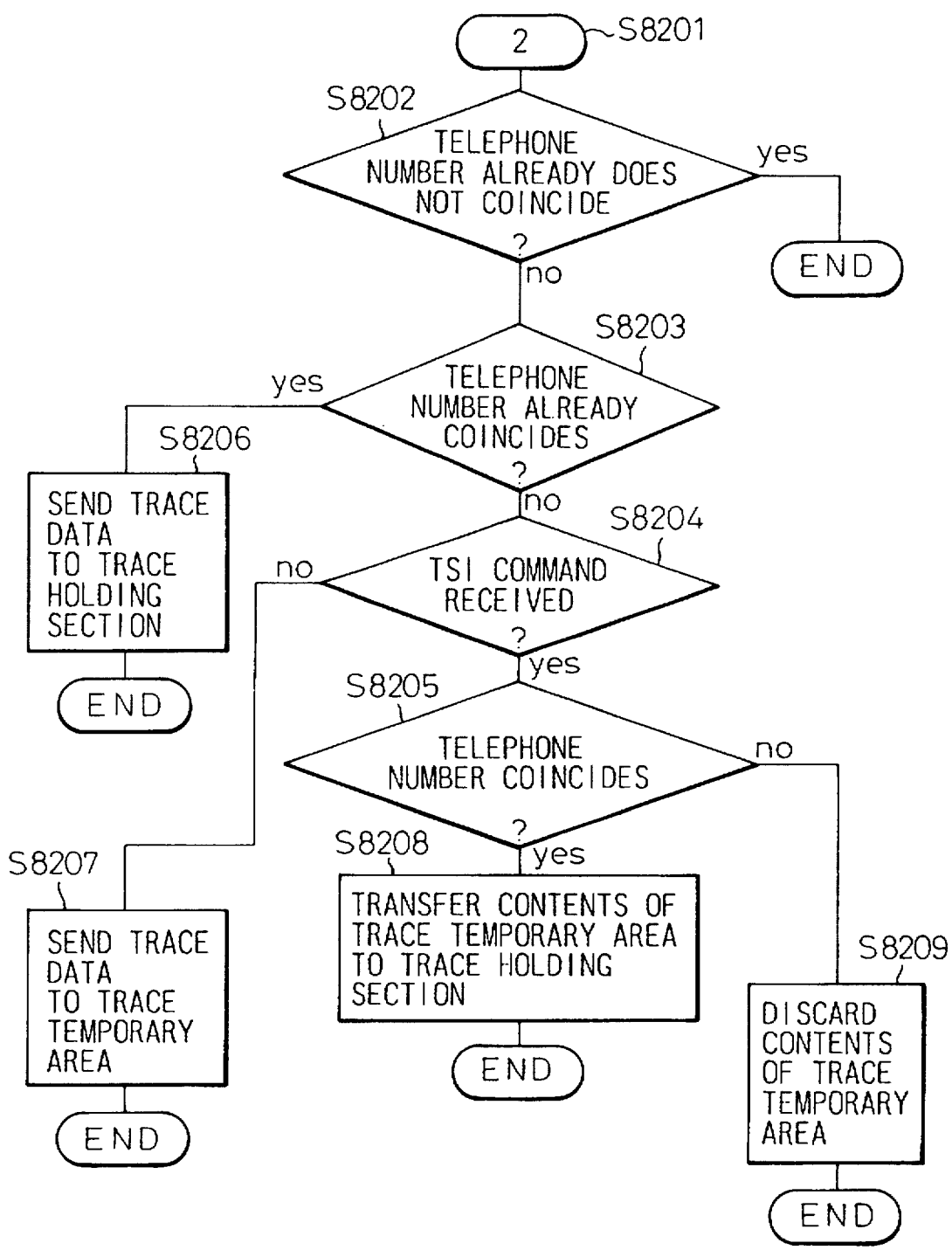
FIG. 34 is a flowchart which shows an example of the TSI mask mode processing flow.

FIG. 34 shows an example of the specific processing flow for the TSI mask mode (2) in FIG. 32.

Figure 35:
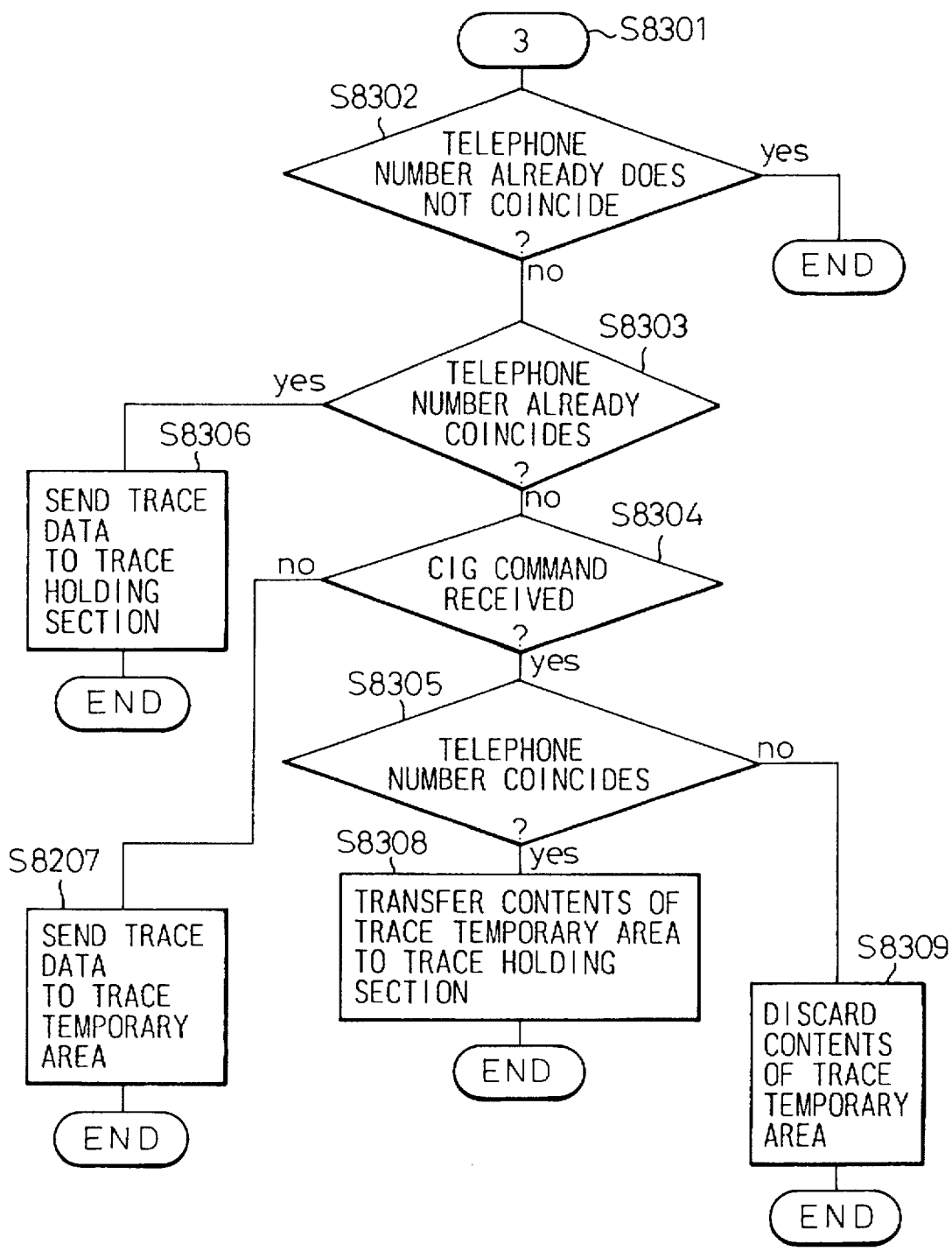
FIG. 35 is a flowchart which shows an example of the CIG mask mode processing flow.

FIG. 35 shows an example of the specific processing flow for the CIG mask mode (3) in FIG. 32.

The modes shown in FIG. 34 and FIG. 35 are similar to that shown in FIG. 33, with the exception that the items compared are different, being the TSI and the CIG commands, respectively, in these cases. They will, therefore, not be explained explicitly herein.

Figure 36:
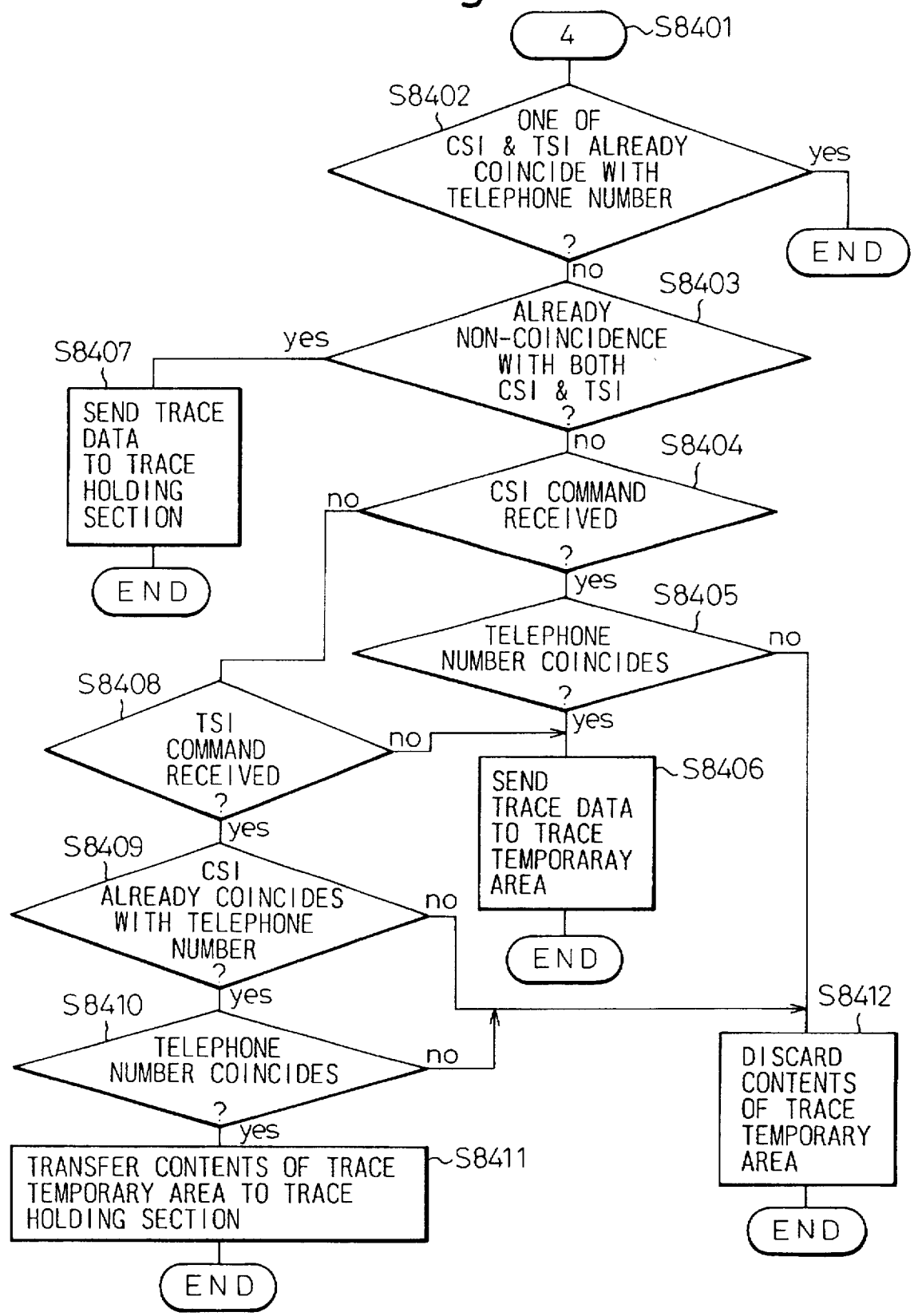
FIG. 36 is a flowchart which shows an example of the CSI&TSI mask mode processing flow.

FIG. 36 shows an example of the specific processing flow for the CSI&TSI mask mode (4) in FIG. 32.

In FIG. 36, if the trace internal processing section 42 has already recognized the coincidence with the telephone numbers associated with both the CSI command and the TSI command, the associated trace data is sent to the trace holding section 43 (S8403, S8407). If it has already been recognized that the telephone numbers associated with the CSI and the TSI commands differ, the trace data held in the trace temporary area is discarded, after which trace data is not taken until return to the voice mode (S8405, S8409, S8412, S8402).

If the fact that there is coincidence with one of the two telephone numbers has not been recognized, if the command was the CSI command, a comparison is made between the telephone number associated with its parameter and the telephone number held in the trace mode holding section 41. If the numbers do not coincide, the trace data held in the trace temporary area is discarded, after which trace data is not taken until return is made to the voice mode (S8404, S8405, S8412).

If there was coincidence of the telephone numbers, the trace data is held in the trace temporary area 44 (S8405, S8406). If the command that had been sent is the TSI command, a test to see if there is coincidence with the CSI telephone number is made, and if there is no coincidence, the trace data held in the temporary trace area is discarded, after which trace data is not taken until return to the voice mode (S8408, S8409, S8412).

When, there is coincidence, a comparison is made between the telephone number associated with its parameter and the telephone number held in the trace mode holding section 41. If the numbers do not coincide, the trace data held in the trace temporary area is discarded, after which trace data is not taken until return to the voice mode (S8404, S8405, S8412). If the numbers coincide, the trace data held in the trace temporary area 44 and this command are transferred to the trace holding section 43, after which trace data is stored in the trace holding area until return to the voice mode (S8410, S8411).

Figure 37:
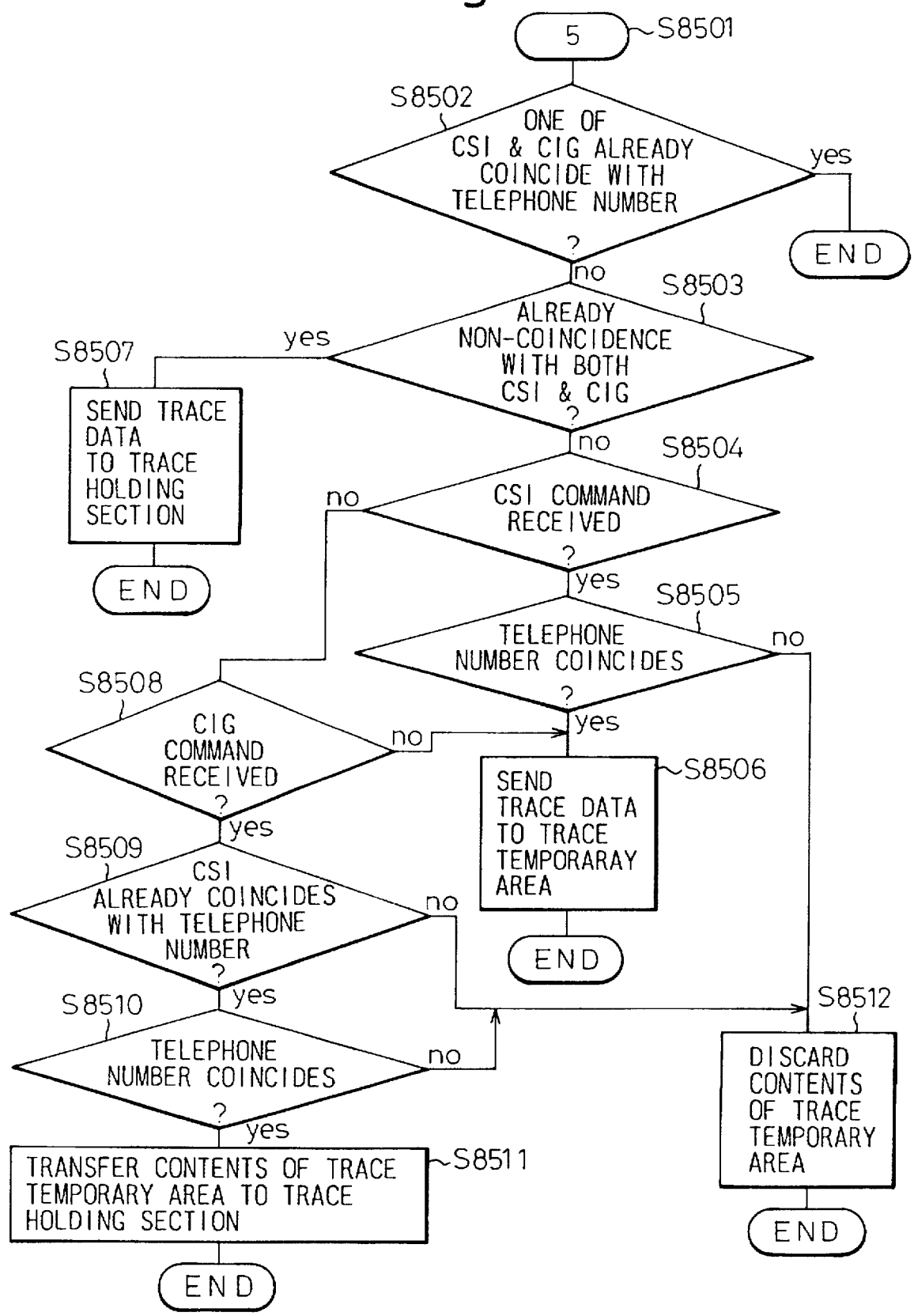
FIG. 37 is a flowchart which shows an example of the CSI&CIG mask mode processing flow.

FIG. 37 shows an example of the specific processing flow for the CSI&CIG mask mode (5) in FIG. 32.

Figure 38:
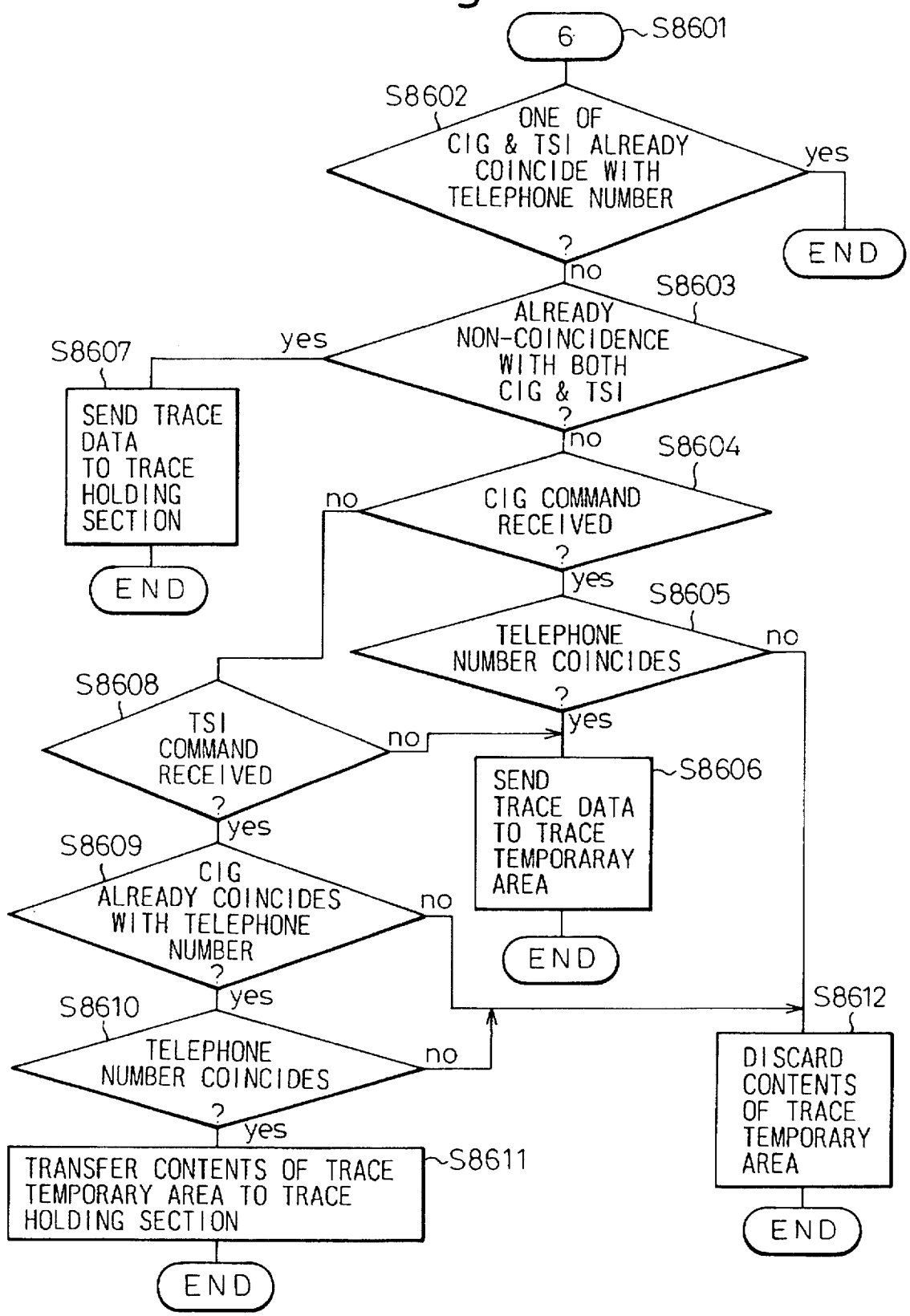
FIG. 38 is a flowchart which shows an example of the CIG&TSI mask mode processing flow.

FIG. 38 shows an example of the specific processing flow for the CIG&TSI mask mode (6) in FIG. 32.

The modes shown in FIG. 37 and FIG. 38 are similar to that shown in FIG. 36, with the exception that the pairs of items compared are different, these being the CSI&CIG and CIG&TSI, respectively, in these cases. They will, therefore, not be explained explicitly herein.

Figure 39:
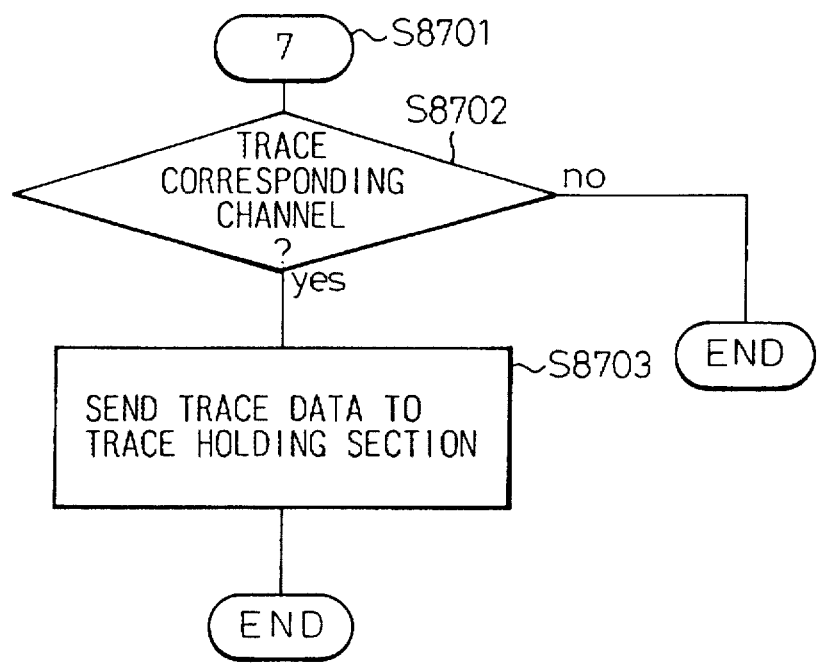
FIG. 39 is a flowchart which shows an example of the channel mask mode processing flow.

FIG. 39 shows an example of the specific processing flow for the channel mask mode (7) in FIG. 32.

The prerequisite for this mode, shown in FIG. 39, is that the channel for masking, which is given together with the instruction to select this trace operating mode, is held in the trace operating mode holding section 41. When this mode is enabled, if a command which is sent to the trace internal processing section 42 is of the channel which is held in the trace operating mode holding section 41, it is stored in the trace holding section 43 (S8702, S8703).

While it is not shown in the processing flowcharts discussed above, in the case of the tracing inhibited mode, the holding of trace data for a received command into the trace internal holding section 42 is prohibited, thereby preventing the loss of previous data by overwriting.

Figure 40:
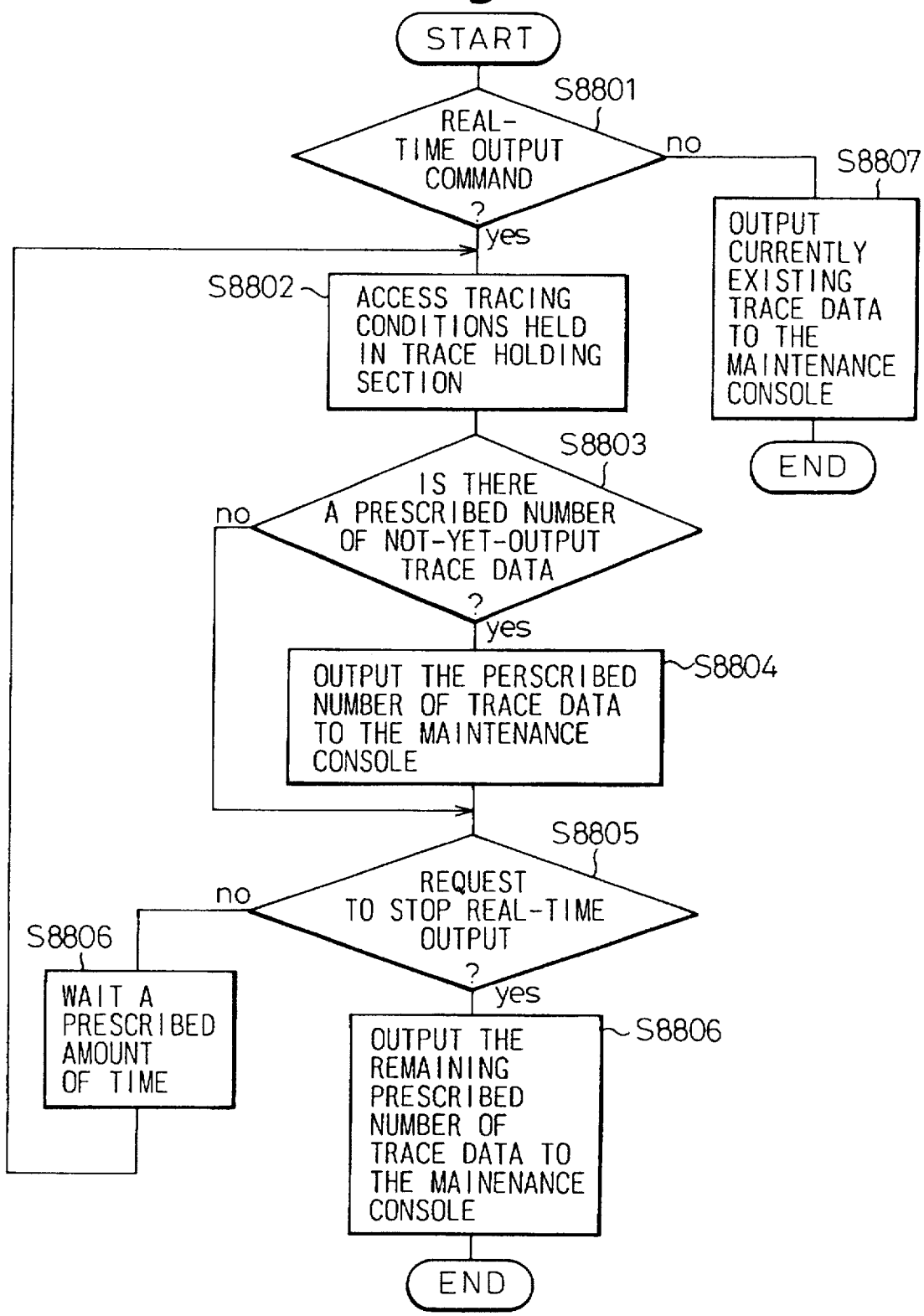
FIG. 40 is a flowchart which shows an example of the maintenance console display control flow.

FIG. 40 shows an example of the display control processing flow of the maintenance console 5.

In FIG. 40, a request is made from the maintenance console 5 to the tracing section 4, which is shown in FIG. 28 or FIG. 29, for real-time output (S8801). The trace data output section 45 periodically checks whether a prescribed number of traces are stored in the trace holding section 44, and in the case in which the prescribed number of traces are stored, that number of traces are extracted from the trace holding section 44 and output to the maintenance console 5 (S8803, S8804). Thereafter, the above operation is repeated every prescribed time interval (S8806). After the required number of trace data have been obtained, a real-time output stop request is issued from the maintenance console 5, in response to which the trace data output section 45 extracts the last remaining trace data, which are fewer than the prescribed number, from the trace holding section 44, outputs them to the maintenance console 5, and then stops the real-time output (S8805, S8806).

FIG. 41 shows an example of the display screen of the maintenance console 5.

The trace units are shown at the left side and labeled TRACE NO., and under each trace unit is listed the type of command (for example, CED or PREAMBLE), the status (for example, NORMAL or ERROR), and trace data (DATA). On the right side of the display screen is listed the trace starting time (START) and the trace ending time (END), as well as the channel number (0 or 1).

As described above, in the first and second embodiment of the present invention, by merely setting the training signal to the failed condition, the sequence thereafter follows the operation of the facsimile, this being faithful to the communication protocol of the past, and requiring no modification of the communication apparatus, making it extremely easy to synchronize the protocols at the two stations.

In the third and fourth embodiments of the present invention, in the case in which a judgment is made that relaying is not possible, rather than sending a training signal to the receiving-side facsimile machine, the FTT command is sent directly to the transmitting-side facsimile machine, offering advantages such as the reduction of the overall time required for communications.

In the fifth embodiment of the present invention, by making careful selection of the advantages of the above-described embodiments, or of combinations thereof, it is possible to perform relaying of a facsimile signal which is suited to a variety of conditions. An example of an application is the case in which simultaneous use is made of the first embodiment and the second embodiment, or simultaneous use is made of the third embodiment and the fourth embodiment, in which cases it is possible to perform relaying at a speed which is adjusted to the speed of a slower communication apparatus in the case in which the speed between two communication apparatuses differs.

In accordance with the above, in the case of a communication apparatus which relays a facsimile signal over a digital transmission path, it is possible to arbitrarily implement facsimile relaying within the relayable range of the communication apparatus.

Additionally, according to the present invention, in the case in which a communication apparatus relays a facsimile signal over a digital transmission path, it is possible to perform facsimile relaying even in the case in which a phase skew develops between commands and responses, caused by the facsimile response time, the delay in the transmission path, and processing delay in the communication apparatus.

The sixth embodiment of the present invention is effective in cases in which the processing of image information in a receiving-side facsimile machine requires much time, resulting in a delay in the response, and in the case in which image information is stored in a DASD, such as in a mailing device.

The seventh embodiment of the present invention is effective in the case in which there is a facsimile machine connected which ignores the first command, because it does not cause a time-out while waiting for a command at the receiving-side facsimile machine. In another aspect of the seventh embodiment of the present invention, if the absolute amount of time until a response is returned after the sending of a command is defined as a certain length of time, although the response time is not that long, there is an advantage that responses can be discarded at the transmitting side, in the case in which, because of, for example, transmission path delays between the communication apparatuses, there are responses that could not be fully discarded at the receiving side, and two of the above-described embodiments are used in combination, there are an increasing number of cases in which such crossing of commands and responses can be prevented.

Additionally, according to the eighth embodiment of the present invention, in the case in which a communication apparatus which relays a facsimile signal over a digital transmission path, even if switching equipment or the like is located between the communication apparatus and the facsimile machine, making it uncertain what channel is being used within the communication apparatus, it is possible to perform a communication trace of only a specific facsimile machine.

Because the storage capacity for trace data is finite, memory space is saved by being able to specifying conditions when tracing a fault in a specific facsimile communications.

What is claimed is:

1. A GIII facsimile signal relay communication apparatus, in which a modulated signal from a transmitting-side facsimile machine is demodulated using a modem, said demodulated signal being sent to a digital transmission path, the received digital signal being modulated once again and sent to a receiving-side facsimile machine, comprising:

a facsimile command receiving processing section which detects and processes a facsimile command signal received from a facsimile machine, and which further sends said command to the other side's relay communication apparatus, said facsimile command receiving processing section further comprising:

a command detecting section which recognizes commands and the training condition from a facsimile machine, a command interpreting section which judges whether said recognized command is a DCS command and which further, from said DCS command and said training condition, sends said command to the other side's relay communication apparatus, and a command holding section which, in the case in which said command interpreting section judges a command to be a DCS command, temporarily holds said DCS command; and a facsimile command transmitting processing section which detects and processes a facsimile command received from the other side's relay communication apparatus, and which further sends said command to a facsimile machine, said facsimile command transmitting processing section further comprising:

a command relay receiving section which recognizes a command and a training condition from the other side's relay communication apparatus, a command interpreting section which judges whether said recognized command is a DCS command and which further, from said DCS command and said training condition, judges the training condition to be sent, a commanding holding section which, in the case in which said command interpreting section judges a command to be a DCS command, temporarily holds said DCS command, and a command transmitting section which sends a command given from said command interpreting section and a prescribed training condition to a facsimile machine.

2. A relay communication apparatus according to claim 1, wherein in the case in which said command interpreting section in said facsimile command receiving processing section verifies the normal termination of the training signal, the communication speed of the DCS command which is held in said command holding section and the image information transfer capacity are checked, and if a judgment is made that relaying is not possible, said DCS command and an intentionally failed training signal are send to said command relay transmitting section.

3. A relay communication apparatus according to claim 1, wherein in the case in which said command interpreting section in said facsimile command receiving processing section verifies the normal termination of the training signal, the communication speed of the DCS command which is held in said command holding section and the image information transfer capacity are checked, and if a judgment is made that relaying is not possible, said DCS command and an intentionally failed training signal are send to said command transmitting section.

4. A relay communication apparatus according to claim 1, wherein in the case in which said command interpreting section in said facsimile command receiving processing section verifies the normal termination of the training signal, the communication speed of the DCS command which is held in said command holding section and the image information transfer capacity are checked, and if a judgment is made that relaying is not possible, a notification of relaying being impossible is made to said command interpreting section of said facsimile command transmitting processing section, and further wherein in the case in which the said command interpreting section of the said facsimile command transmitting section receives said notification of relaying being impossible, an FTT command is sent to said command transmitting section.

5. A relay communication apparatus according to claim 1, wherein in the case in which said command interpreting section in said facsimile command receiving processing section verifies the normal termination of the training signal, the communication speed of the DCS command which is held in said command holding section and the image information transfer capacity are checked, and if a judgment is made that relaying is not possible, a notification of relaying being impossible is made to said command interpreting section of said facsimile command receiving processing section, and further wherein in the case in which the said command interpreting section of the said facsimile command receiving section receives said notification of relaying being impossible, an FTT command is sent to said command transmitting section.

6. A relay communication apparatus according to claim 1, further comprising an operating mode storage section for the purpose of selectively setting the relayed contents which are established by said command interpreting section, one of a plurality of selections of relayed contents corresponding to the results of a command comparison in said command interpreting section being selected, in accordance with the contents of said operating mode storage section.

7. A GIII facsimile signal relay apparatus, in which a modulated signal from a transmitting-side facsimile machine is demodulated using a modem, said demodulated signal being sent to a digital transmission path, the received digital signal being modulated once again and sent to a receiving-side facsimile machine, comprising:

a facsimile command receiving processing section which detects and processes a facsimile command signal received from a facsimile machine, and which further sends said command to the other side's relay communication apparatus, said facsimile command receiving processing section further comprising:

a command detecting section which recognizes commands and responses from a facsimile machine, a command interpreting section which judges and controls, from a timer condition and the current stage in a protocol, whether a command or response received from a facsimile machine is to be sent to the other side's relay transmitting communication apparatus, and a command relay transmitting section which sends a command or response received from said command interpreting section to the other side's relay transmitting communication apparatus; and a facsimile command transmitting section which detects and processes a facsimile command signal received from the other side's relay transmitting communication apparatus and sends said command signal to a facsimile machine, said facsimile command transmitting section further comprising:

a timer section which monitors the time-out time from the time a command is sent to a facsimile machine to the time at which a response is returned, a command interpreting section which judges and controls, from the time-out condition of said timer section and the current stage in a protocol, whether a command or response received from the other side's relay communication apparatus is to be sent to a facsimile machine, and a command transmitting section which sends a command or a response given from said command interpreting section to a facsimile machine.

8. A relay communication apparatus according to claim 7, further comprising a command holding section which temporarily holds a command or a response given from said command interpreting section, and wherein in the case in which said timer section times out, a command which is held in said command holding section is resent via said command interpreting section and said command transmitting section.

9. A GIII facsimile signal relay communication apparatus, in which a modulated signal from a transmitting-side facsimile machine is demodulated using a modem, said demodulated signal being sent to a digital transmission path, the received digital signal being modulated once again and sent to a receiving-side facsimile machine, said relay communication apparatus comprising a tracing section which performs a communication protocol trace between the other stations relay communication apparatus and the included facsimile machine, said tracing section performing a comparison between a command which includes a pre-established terminal identifier and a prespecified telephone number, and holds the trace data only in the case in which these coincide.

10. A facsimile relay communication apparatus according to claim 9, wherein said command which includes said pre-established terminal identifier is a CSI (calling station identifier) command.

11. A facsimile relay communication apparatus according to claim 9, wherein said command which includes said pre-established terminal identifier is a TSI (transmitting subscriber identification) command.

12. A facsimile relay communication apparatus according to claim 9, wherein said command which includes said pre-established terminal identifier is a CIG (calling subscriber identification) command.

13. A facsimile relay communication apparatus according to claim 9, wherein said commands which include said pre-established terminal identifier are the CSI (calling station identifier) command and the TSI (transmitting subscriber identification) command, and wherein trace data is held only in the case in which both said CSI and said TSI commands coincide with the pre-specified telephone number.

14. A facsimile relay communication apparatus according to claim 9, wherein said commands which include said pre-established terminal identifier are the CSI (calling station identifier) command and the CIG (calling subscriber identification) command, and wherein trace data is held only in the case in which both said CSI and said CIG commands coincide with the pre-specified telephone number.

15. A facsimile relay communication apparatus according to claim 9, wherein said commands which include said pre-established terminal identifier are the TSI (transmitting subscriber identification) command and the CIG (calling subscriber identification) command, and wherein trace data is held only in the case in which both said TSI and said CIG commands coincide with the pre-specified telephone number.

16. A facsimile relay communication apparatus according to claim 9, wherein in the case in which said relay communication apparatus uses a plurality of channels, a physical channel to be traced is pre-specified, and trace data is held only when the channel number coincides with said pre-specified channel number.

17. A facsimile relay communication apparatus according to claim 9, wherein said tracing section has a mode specification for a mode in which trace data is not held.

18. A facsimile relay communication apparatus according to claim 9, further comprising a display section which converts said held trace data into a prescribed format and displays said converted trace data in real time.

* * * * *